(12) United States Patent
Michaels et al.

(10) Patent No.: US 8,363,700 B2
(45) Date of Patent: Jan. 29, 2013

(54) RAKE RECEIVER FOR SPREAD SPECTRUM CHAOTIC COMMUNICATIONS SYSTEMS

(75) Inventors: Alan J. Michaels, West Melbourne, FL (US); David B. Chester, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 668 days.

(21) Appl. No.: 12/496,123

(22) Filed: Jul. 1, 2009

(65) Prior Publication Data
US 2011/0002366 A1 Jan. 6, 2011

(51) Int. Cl.
*H04B 1/00* (2006.01)

(52) U.S. Cl. .................................................. 375/148

(58) Field of Classification Search ............... 375/130, 375/131, 140, 141, 146, 147, 148, 150, 242, 375/253, 295, 316, 367; 370/320, 335, 338, 370/342, 441
See application file for complete search history.

(56) References Cited

U.S. PATENT DOCUMENTS

| | | |
|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 4,893,316 A | 1/1990 | Janc et al. |
| 5,007,087 A | 4/1991 | Bernstein et al. |
| 5,048,086 A | 9/1991 | Bianco et al. |
| 5,077,793 A | 12/1991 | Falk et al. |
| 5,210,770 A | 5/1993 | Rice |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,596,600 A | 1/1997 | Dimos et al. |
| 5,598,476 A | 1/1997 | LaBarre et al. |

(Continued)

FOREIGN PATENT DOCUMENTS

| | | |
|---|---|---|
| EP | 0 849 664 A2 | 6/1998 |
| EP | 0 949 563 | 10/1999 |

(Continued)

OTHER PUBLICATIONS

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

(Continued)

*Primary Examiner* — David C. Payne
*Assistant Examiner* — Syed Haider
(74) *Attorney, Agent, or Firm* — Fox Rothschild, LLP; Robert J. Sacco

(57) ABSTRACT

A receiver (104) in communications system (100) includes an antenna system (302) for receiving a composite signal comprising multi-path components associated with the multi-path images of a transmitted signal. The receiver also includes a correlation system (368) for correlating the received composite signal with a spreading sequence using different time-offset values to generate time-offset de-spread signals associated with at least a portion the multi-path images, where the spreading sequence is based on sequence of discrete-time chaotic samples. The receiver further includes receiver fingers (108a-108n) for generating synchronized de-spread signals from the time-offset de-spread signals based at least on said time-offset values. The receiver also includes a combiner (350) for combining the de-spread signals into a combined coherent de-spread signal.

20 Claims, 7 Drawing Sheets

102

U.S. PATENT DOCUMENTS

| | | |
|---|---|---|
| 5,646,997 A | 7/1997 | Barton |
| 5,677,927 A * | 10/1997 | Fullerton et al. ............... 375/130 |
| 5,680,462 A | 10/1997 | Miller et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,923,760 A | 7/1999 | Abarbanel et al. |
| 5,924,980 A | 7/1999 | Coetzee |
| 5,937,000 A | 8/1999 | Lee et al. |
| 6,014,446 A | 1/2000 | Finkelstein |
| 6,023,612 A | 2/2000 | Harris et al. |
| 6,038,317 A | 3/2000 | Magliveras et al. |
| 6,078,611 A | 6/2000 | La Rosa et al. |
| 6,141,786 A | 10/2000 | Cox et al. |
| 6,212,239 B1 | 4/2001 | Hayes |
| 6,304,216 B1 | 10/2001 | Gronemeyer |
| 6,304,556 B1 | 10/2001 | Haas |
| 6,310,906 B1 | 10/2001 | Abarbanel et al. |
| 6,314,187 B1 | 11/2001 | Menkhoff et al. |
| 6,331,974 B1 * | 12/2001 | Yang et al. ..................... 370/342 |
| 6,377,782 B1 | 4/2002 | Bishop et al. |
| 6,473,448 B1 | 10/2002 | Shono et al. |
| 6,570,909 B1 | 5/2003 | Kansakoski et al. |
| 6,614,914 B1 | 9/2003 | Rhoads et al. |
| 6,665,692 B1 | 12/2003 | Nieminen |
| 6,732,127 B2 | 5/2004 | Karp |
| 6,744,893 B1 | 6/2004 | Fleming-Dahl |
| 6,754,251 B1 | 6/2004 | Sriram et al. |
| 6,766,345 B2 | 7/2004 | Stein et al. |
| 6,842,479 B2 | 1/2005 | Bottomley |
| 6,842,745 B2 | 1/2005 | Occhipinti et al. |
| 6,864,827 B1 | 3/2005 | Tise et al. |
| 6,865,218 B1 * | 3/2005 | Sourour ........................ 375/148 |
| 6,888,813 B1 | 5/2005 | Kishi |
| 6,901,104 B1 | 5/2005 | Du et al. |
| 6,937,568 B1 | 8/2005 | Nicholl et al. |
| 6,980,656 B1 | 12/2005 | Hinton, Sr. et al. |
| 6,980,657 B1 | 12/2005 | Hinton, Sr. et al. |
| 6,986,054 B2 | 1/2006 | Kaminaga et al. |
| 6,993,016 B1 | 1/2006 | Liva et al. |
| 6,999,445 B1 | 2/2006 | Dmitriev et al. |
| 7,023,323 B1 | 4/2006 | Nysen |
| 7,027,598 B1 | 4/2006 | Stojancic et al. |
| 7,035,220 B1 | 4/2006 | Simcoe |
| 7,069,492 B2 | 6/2006 | Piret et al. |
| 7,076,065 B2 | 7/2006 | Sherman et al. |
| 7,078,981 B2 | 7/2006 | Farag |
| 7,079,651 B2 | 7/2006 | Den Boer et al. |
| 7,095,778 B2 | 8/2006 | Okubo et al. |
| 7,133,522 B2 | 11/2006 | Lambert |
| 7,170,997 B2 | 1/2007 | Petersen et al. |
| 7,190,681 B1 | 3/2007 | Wu |
| 7,200,225 B1 | 4/2007 | Schroeppel |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,269,198 B1 | 9/2007 | Elliott et al. |
| 7,269,258 B2 | 9/2007 | Ishihara et al. |
| 7,272,168 B2 | 9/2007 | Akopian |
| 7,277,540 B1 | 10/2007 | Shiba et al. |
| 7,286,802 B2 | 10/2007 | Beyme et al. |
| 7,310,309 B1 | 12/2007 | Xu |
| 7,349,381 B1 | 3/2008 | Clark et al. |
| 7,423,972 B2 | 9/2008 | Shaham et al. |
| 7,529,292 B2 | 5/2009 | Bultan et al. |
| 7,643,537 B1 | 1/2010 | Giallorenzi et al. |
| 7,725,114 B2 | 5/2010 | Feher |
| 7,779,060 B2 | 8/2010 | Kocarev et al. |
| 7,830,214 B2 | 11/2010 | Han et al. |
| 7,853,014 B2 | 12/2010 | Blakley et al. |
| 7,929,498 B2 | 4/2011 | Ozluturk et al. |
| 7,974,146 B2 | 7/2011 | Barkley |
| 2001/0017883 A1 * | 8/2001 | Tiirola et al. ................... 375/148 |
| 2002/0012403 A1 | 1/2002 | McGowan et al. |
| 2002/0034191 A1 | 3/2002 | Shattil |
| 2002/0034215 A1 * | 3/2002 | Inoue et al. .................... 375/147 |
| 2002/0041623 A1 | 4/2002 | Umeno |
| 2002/0054682 A1 | 5/2002 | Di Bernardo et al. |
| 2002/0099746 A1 | 7/2002 | Tie et al. |
| 2002/0110182 A1 | 8/2002 | Kawai |
| 2002/0115461 A1 | 8/2002 | Shiraki et al. |
| 2002/0122465 A1 | 9/2002 | Agee et al. |
| 2002/0128007 A1 | 9/2002 | Miyatani |
| 2002/0172291 A1 | 11/2002 | Maggio et al. |
| 2002/0174152 A1 | 11/2002 | Terasawa et al. |
| 2002/0176511 A1 | 11/2002 | Fullerton et al. |
| 2002/0186750 A1 | 12/2002 | Callaway et al. |
| 2003/0007639 A1 | 1/2003 | Lambert |
| 2003/0016691 A1 | 1/2003 | Cho |
| 2003/0044004 A1 | 3/2003 | Blakley et al. |
| 2003/0156603 A1 | 8/2003 | Rakib et al. |
| 2003/0182246 A1 | 9/2003 | Johnson et al. |
| 2003/0198184 A1 | 10/2003 | Huang et al. |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0100588 A1 | 5/2004 | Hartson et al. |
| 2004/0146095 A1 | 7/2004 | Umeno et al. |
| 2004/0156427 A1 | 8/2004 | Gilhousen et al. |
| 2004/0161022 A1 * | 8/2004 | Glazko et al. .................. 375/152 |
| 2004/0165681 A1 | 8/2004 | Mohan |
| 2004/0196212 A1 | 10/2004 | Shimizu |
| 2004/0196933 A1 | 10/2004 | Shan et al. |
| 2005/0004748 A1 | 1/2005 | Pinto et al. |
| 2005/0021308 A1 | 1/2005 | Tse et al. |
| 2005/0031120 A1 | 2/2005 | Samid |
| 2005/0050121 A1 | 3/2005 | Klein et al. |
| 2005/0075995 A1 | 4/2005 | Stewart et al. |
| 2005/0089169 A1 | 4/2005 | Kim et al. |
| 2005/0129096 A1 | 6/2005 | Zhengdi et al. |
| 2005/0207574 A1 | 9/2005 | Pitz et al. |
| 2005/0249271 A1 | 11/2005 | Lau et al. |
| 2005/0259723 A1 | 11/2005 | Blanchard |
| 2005/0265430 A1 | 12/2005 | Ozluturk et al. |
| 2005/0274807 A1 | 12/2005 | Barrus et al. |
| 2006/0072754 A1 | 4/2006 | Hinton et al. |
| 2006/0088081 A1 * | 4/2006 | Withington et al. ........... 375/130 |
| 2006/0093136 A1 | 5/2006 | Zhang et al. |
| 2006/0123325 A1 | 6/2006 | Wilson et al. |
| 2006/0209926 A1 | 9/2006 | Umeno et al. |
| 2006/0209932 A1 | 9/2006 | Khandekar et al. |
| 2006/0251250 A1 * | 11/2006 | Ruggiero et al. ............... 380/46 |
| 2006/0264183 A1 | 11/2006 | Chen et al. |
| 2007/0098054 A1 | 5/2007 | Umeno |
| 2007/0121945 A1 | 5/2007 | Han et al. |
| 2007/0133495 A1 | 6/2007 | Lee et al. |
| 2007/0149232 A1 | 6/2007 | Koslar |
| 2007/0195860 A1 | 8/2007 | Yang et al. |
| 2007/0201535 A1 | 8/2007 | Ahmed |
| 2007/0230701 A1 | 10/2007 | Park et al. |
| 2007/0253464 A1 | 11/2007 | Hori et al. |
| 2007/0291833 A1 | 12/2007 | Shimanskiy |
| 2008/0008320 A1 | 1/2008 | Hinton et al. |
| 2008/0016431 A1 | 1/2008 | Lablans |
| 2008/0075195 A1 | 3/2008 | Pajukoski et al. |
| 2008/0080439 A1 * | 4/2008 | Aziz et al. ...................... 370/338 |
| 2008/0084919 A1 | 4/2008 | Kleveland et al. |
| 2008/0095215 A1 | 4/2008 | McDermott et al. |
| 2008/0107268 A1 | 5/2008 | Rohde et al. |
| 2008/0198832 A1 | 8/2008 | Chester |
| 2008/0204306 A1 | 8/2008 | Shirakawa |
| 2008/0263119 A1 | 10/2008 | Chester et al. |
| 2008/0294707 A1 | 11/2008 | Suzuki et al. |
| 2008/0294710 A1 | 11/2008 | Michaels |
| 2008/0294956 A1 | 11/2008 | Chester et al. |
| 2008/0304553 A1 | 12/2008 | Zhao et al. |
| 2008/0304666 A1 | 12/2008 | Chester et al. |
| 2008/0307022 A1 | 12/2008 | Michaels et al. |
| 2008/0307024 A1 | 12/2008 | Michaels et al. |
| 2009/0022212 A1 * | 1/2009 | Ito et al. ......................... 375/150 |
| 2009/0034727 A1 | 2/2009 | Chester et al. |
| 2009/0044080 A1 | 2/2009 | Michaels et al. |
| 2009/0059882 A1 | 3/2009 | Hwang et al. |
| 2009/0110197 A1 | 4/2009 | Michaels |
| 2009/0122926 A1 | 5/2009 | Azenkot et al. |
| 2009/0196420 A1 | 8/2009 | Chester et al. |

| | | | |
|---|---|---|---|
| 2009/0202067 A1 | 8/2009 | Michaels et al. | |
| 2009/0245327 A1 | 10/2009 | Michaels | |
| 2009/0279688 A1 | 11/2009 | Michaels et al. | |
| 2009/0279690 A1 | 11/2009 | Michaels et al. | |
| 2009/0285395 A1 | 11/2009 | Hu et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0316679 A1 | 12/2009 | Van Der Wateren | |
| 2009/0323766 A1 | 12/2009 | Wang et al. | |
| 2009/0327387 A1 | 12/2009 | Michaels et al. | |
| 2010/0030832 A1* | 2/2010 | Mellott | 708/491 |
| 2010/0054225 A1 | 3/2010 | Hadef et al. | |
| 2010/0073210 A1 | 3/2010 | Bardsley et al. | |
| 2010/0111296 A1 | 5/2010 | Brown et al. | |
| 2010/0142593 A1 | 6/2010 | Schmid | |
| 2010/0254430 A1 | 10/2010 | Lee et al. | |
| 2010/0260276 A1 | 10/2010 | Orlik et al. | |
| 2011/0222393 A1 | 9/2011 | Kwak et al. | |

FOREIGN PATENT DOCUMENTS

| | | | |
|---|---|---|---|
| EP | 2 000 900 A2 | 12/2008 | |
| EP | 2 000 902 A2 | 12/2008 | |
| GB | 1167272 A | 10/1969 | |
| JP | 7140983 A | 6/1995 | |
| JP | 2001255817 A | 9/2001 | |
| JP | 2004279784 A | 10/2004 | |
| JP | 2005017612 A | 1/2005 | |
| WO | WO-0135572 A2 | 5/2001 | |
| WO | WO-2006 110954 | 10/2006 | |
| WO | WO 2008 065191 | 6/2008 | |
| WO | WO-2008099367 A2 | 8/2008 | |
| WO | WO-2008130973 A1 | 10/2008 | |
| WO | WO 2009 146283 | 12/2009 | |

OTHER PUBLICATIONS

Barile, Margherita, "Bijective," From MathWorld—A Wolfram Web Resource, created by Eric W. Weisstein. http://mathworld.wolfram.com/Bijective.html.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISNB: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online]

Vo. 69, No. 2, Feb. 1, 2004, pp. 26201-26201, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m−1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource, http://mathworld.wolfram.com/Surjection.html.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable PAPR Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".
Micheals, et al., U.S. Appl. No. 12/496,085, filed Jul. 1, 2009, entitled, "High-Speed Cryptographic System Using Chaotic Sequences".
Michaels, et al., U.S. Appl. No. 12/496,123, filed Jul. 1, 2009, entitled, "Rake Receiver for Spread Spectrum Chaotic Communications Systems".
Michaels, et al., U.S. Appl. No. 12/496,146, filed Jul. 1, 2009, entitled "Improved Symbol Estimation for Chaotic Spread Spectrum Signal".
Micheals, et al., U.S. Appl. No. 12/480,316, filed Jun. 8, 2009, entitled "Symbol Duration Dithering for Secured Chaotic Communications".
Michaels, et al., U.S. Appl. No. 12/496,183, filed Jul. 1, 2009, entitled "Bit Error Rate Reduction in Chaotic Communications".
Michaels, Alan, U.S. Appl. No. 12/248,131, filed Oct. 9, 2008, entitled "Ad-Hoc Network Acquisition Using Chaotic Sequence Spread Waveform".
Michaels, Alan, U.S. Appl. No. 12/201,021, filed Aug. 29, 2008, entitled, "Multi-Tier Ad-Hoc Network Communications".
Taylor, F.J., "Residue Arithmetic A Tutorial with Examples", Computer, vol. 17, No. 5, pp. 50-62, May 1984, doi: 10.1109/MC.1984.1659138.
Barda, A; et al., "Chaotic signals for multiple access communications," Electrical and Electronics Engineers in Israel, 1995, Eighteenth Convention of, vol., no., pp. 2.1.3/1-2.1/3/5, Mar. 7-8, 1995.
Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.
Information about Related Patents and Patent Applications, see section 6 of the accompanying Information Disclosure Statement Letter, which concerns Related Patents and Patent Applications.
Menezes, Vanstone, Oorschot: "Handbook of Applied Cryptography", 1997, CRC Press LLC, USA, XP002636791, p. 80-p. 85, p. 238-242.
Schneier, Bruce: "Applied Cryptography Second Edition", 1997, John Wiley & Sons, USA, XP002636792, p. 254-p. 255.
Aparicio; "Communications Systems Based on Chaos" May 2007. Universidad Rey Juan Carlos.
Bererber, S.M., et al., "Design of a CDMA System in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].
Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.
El-Khamy S E: "New trends in wireless multimedia communications based on chaos and fractals" National Radio Science Conference, 2004. NRSC 2004. Proceedings of the Twenty-First Cairo, Egypt March 16-18, 2004, Piscataway, NJ, USA, IEEE, Mar. 16, 2004, pp. _1-1_1, XP010715117 ISBN: 978-977-5031-77-8.
Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.
Soobul, Y., et al. "Digital chaotic coding and modulation in CDMA" IEEE AFRICON 2002 Oct. 2, 2002,Oct. 4, 2002, pp. 841-846, XP002575052 Retrieved from the Internet: URL:http://ieeexplore.ieee.org> [retrieved on Mar. 23, 2010].
Rabiner, Lawrence R., "A Tutorial on Hidden Markov Models and Selected Applications in Speech Recognition", Proceedings of the IEEE, vol. 77, No. 2, Feb. 1989.
Boyar, "Inferring Sequences Produce by Pseudo-Random Number Generators", Journal of the Associate for Computing Machine, vol. 36, No. 1, pp. 20-41, 1989.
Barile, M., "Bijective", From MathWorld-A Wolfram Web Resource, created by Eric W. Weisstein, [online] [retrieved on Nov. 8, 2010] Retrieved from the Internet: <http://mathworld.wolfram.com/Bijective.html>.
Weisstein, E., Surejection:, From MathWorld—AWolfram Web Resource [online] [retrieved on Nov. 8, 2010] Retrieved from the Internet: <http://mathworld.wolfram.com/surjection.html>.
Weisstein, E., Surejection:, From MathWorld—AWolfram Web Resource [online] [retrieved on Nov. 8, 2010] Retrieved from the Internet: http://mathworld.wolfram.com/injection.html>.
Harris Corp., International Search Report mailed Feb. 11, 2010, Application Serial No. PCT/US2009/059948.
Harris Corp., International Search Report mailed Apr. 13, 2010, Application Serial No. PCT/US2009/0069121.
Harris Corp., International Search Report mailed Apr. 13, 2010, Application Serial No. PCT/US2009/0069118.
Harris Corp., European Search Report mailed Mar. 4, 2010, Patent Application No. 08009745.4.
Socek, D., et al., Short Paper: Enhanced 1-D Chaotic Key Based Algorithm for Image Encryption, Sep. 2005, IEEE.
Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.
Pirkin, Llya, Calculations in Galois Fields., C/C++ Users Journal; Oct. 2004, vol. 22 Issue 10, p. 14-18, 4p, 1 Color Photograph.
Popescu, Angel, A Galois Theory for the Field Extension K ((X))/K., Glasgow Mathematical Journal; Sep. 2010, vol. 52 Issue 3, p. 447-451, 5p.
Pirkin, Ilya, Calculations in Galois Fields., C/C++ Users Journal; Oct. 2004, vol. 22 Issue 10, p. 14-18, 4p, 1 Color Photograph.
Diaz-Toca, G.M. and Lombardi, H. , Dynamic Galois Theory., Journal of Symbolic Computation; Dec. 2010, vol. 45 Issue 12, p. 1316-1329, 14p.
Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.
International Search Report mailed Dec. 30, 2011, European Patent Application No. 11001222.6, in the name of Harris Corporation.
Office Action issued in Japanese Patent Application No. 2010-504206 in the name of Harris Corporation; mailed Jan. 6, 2012.
Bender, et al., "Techniques for data hiding", 1995, IBM Systems Journal, vol. 35, pp. 313-336.

* cited by examiner

100

102

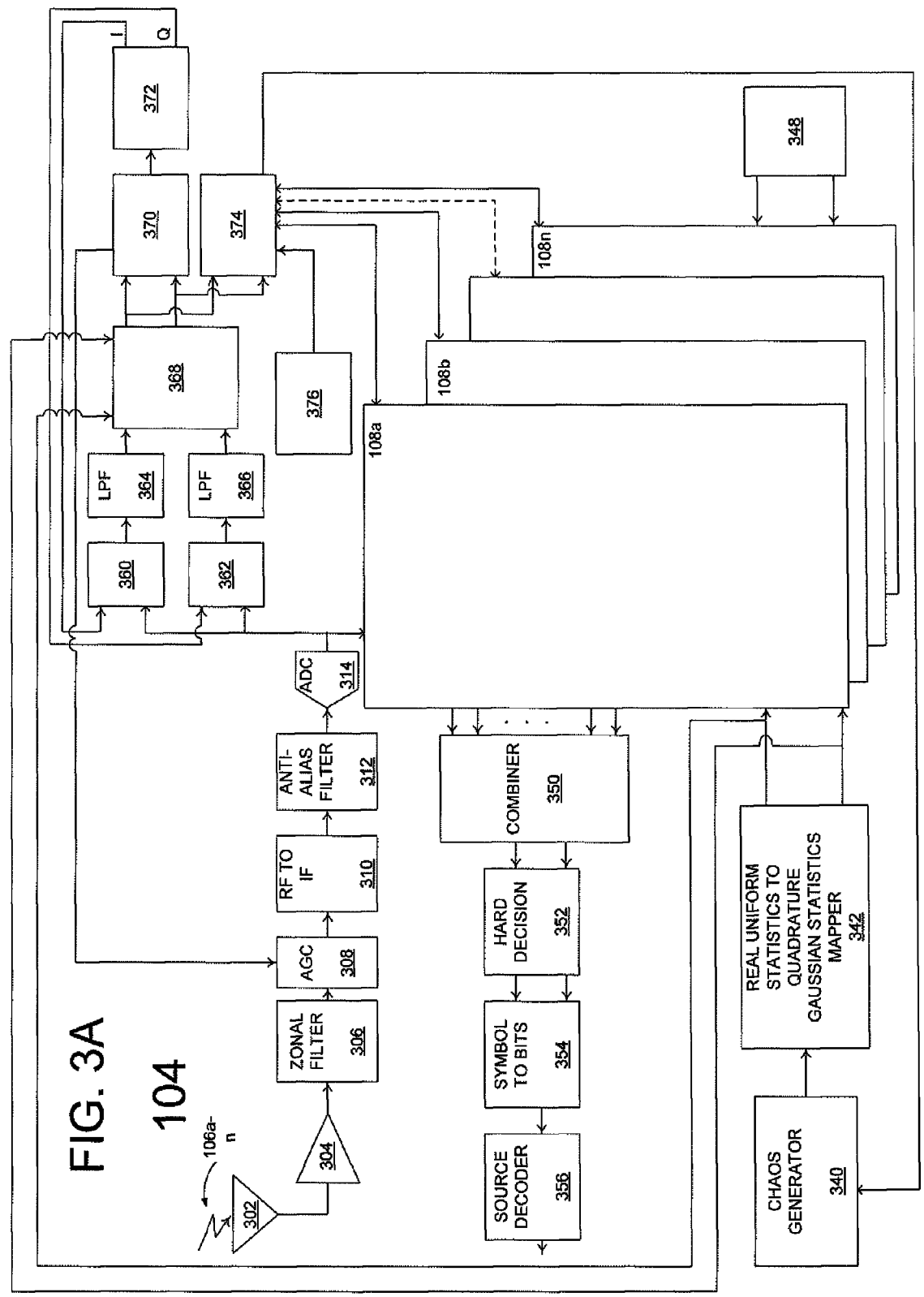

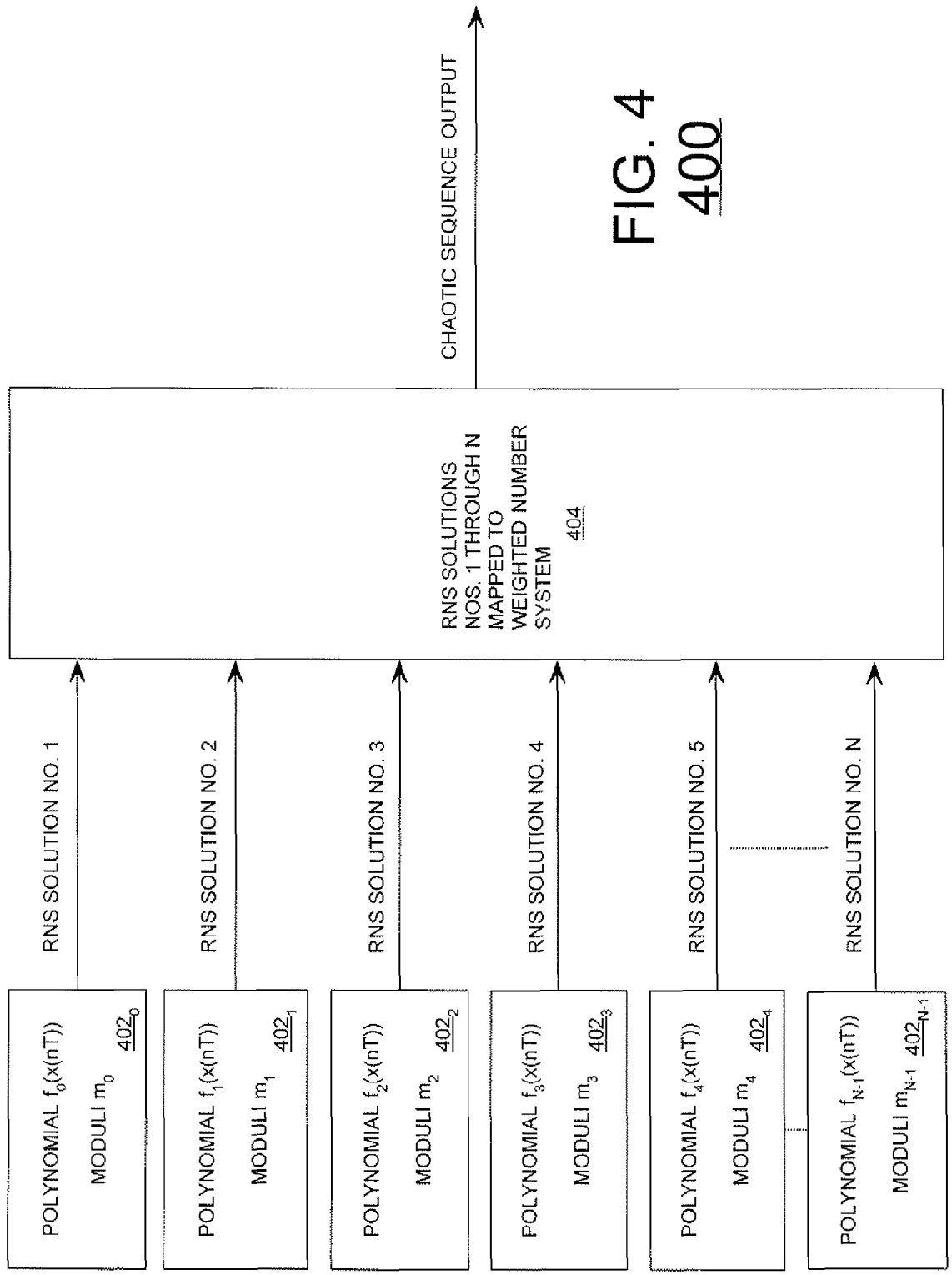

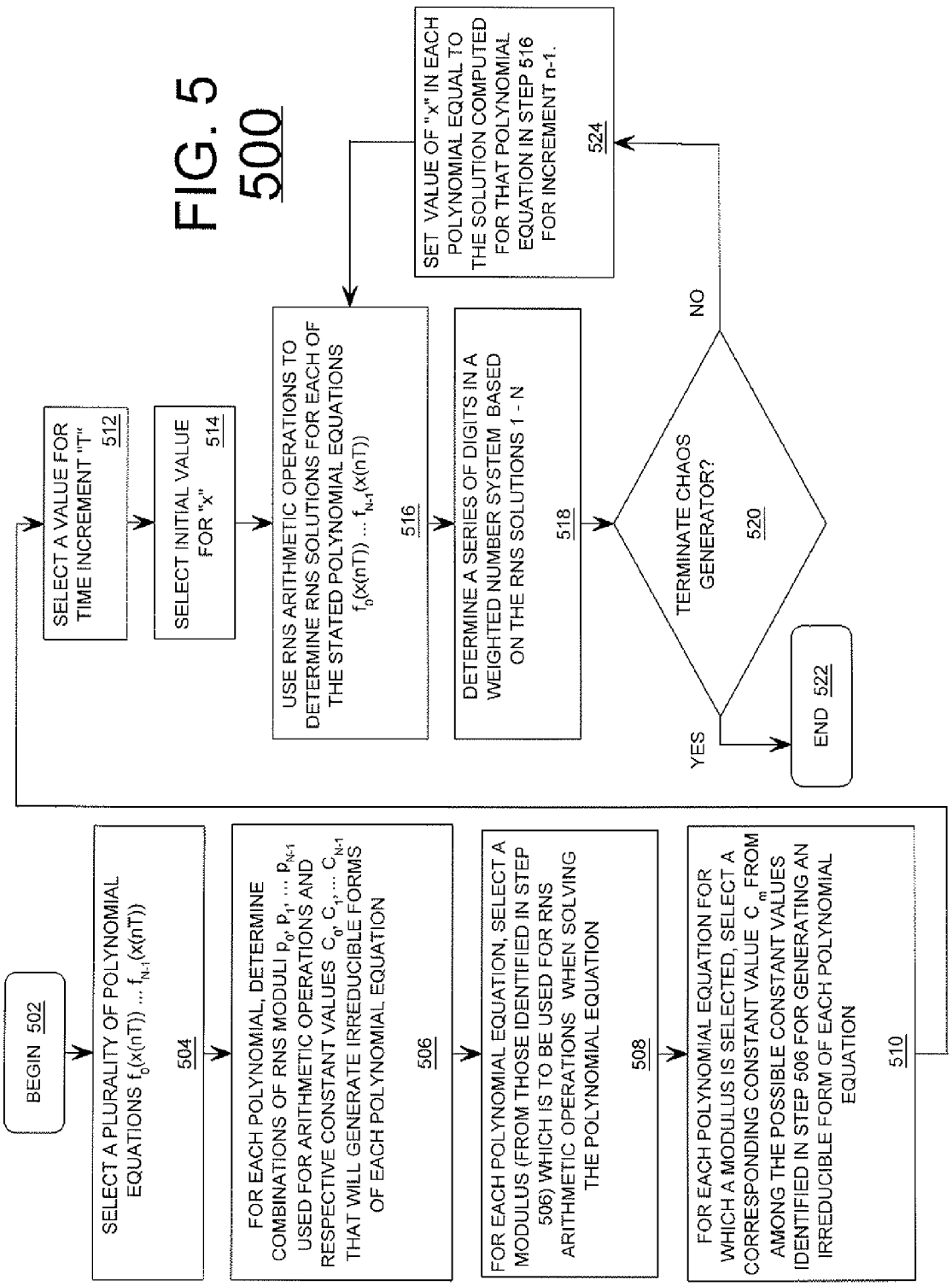

600

RAKE RECEIVER FOR SPREAD SPECTRUM CHAOTIC COMMUNICATIONS SYSTEMS

BACKGROUND OF THE INVENTION

1. Statement of the Technical Field

The present invention is directed to the field of communications. In particular, the present invention is directed to systems and methods for improving signal reception in chaotic communications systems.

2. Description of the Related Art

There are many types of communications systems known in the art, such as multiple access communications systems, low probability of intercept/low probability of detection (LPI/LPD) communications systems and spread spectrum communications systems. Many of these systems depend on spreading sequences. Other systems induce exploitable correlations via square-pulse, square pulse with pulse shaping or use frequency hopped carriers. Non-square-pulse spreading sequences have also been employed but require significantly more computational power to synchronize. Communication signals employing non-square pulse spreading sequences are typically more secure and robust against interferers.

Although spread spectrum communications provide one way of exchanging communications signals robustly or securely, such systems are still susceptible to self-interference caused by multipath images that occur in the physical transmission channel. That is, due to reflections from objects in the transmission channel between a transmitter and a receiver, many copies of the originally transmitted signal may be received at the receiver. Typically, these additional images are time-delayed and can have a different amplitude and phase as compared to the originally transmitted signal, making difficult the recognition of the originally transmitted symbols from the signal received by the receiver. When these multipath images achieve destructive interference, the received signal is said to undergo fading; the wideband nature of a spread spectrum communications signal potentially creates fading that is either flat or frequency selective. Fading effects are well understood.

One proposed method of dealing with such issues has been the use of RAKE receivers. RAKE receivers use multiple receiving elements (RAKE fingers) to receive the multiple copies of signals and can perform demodulation on selected paths and coherently combine the multiple demodulated signals, providing multipath mitigation and improved signal-to-noise (SNR) ratios. When the spreading sequence has acceptable short term and long term correlation properties, the coherent combining can be performed during the dispreading process instead of post demodulation. Direct sequence spread spectrum signals in particular typically rely on correlation-based receivers, resulting in multipath performance that is measurable on the order of a spreading chip duration; square pulse spreading chips as used in direct sequence spread spectrum systems and its multiple access extension CDMA communication systems have disadvantages due to a signal timing ambiguity within the chip, and poor short time correlation properties. More continuous amplitude spreading sequences such as chaotic or CAZAC sequences provide the capability to perform limited multipath image separation with higher resolution. Given the separation capability of these substantially more continuous amplitude spreading signals, it is possible to implement a physically realizable RAKE receiver during the dispreading process that obtain more useable SNR improvements and reduce fading effects than possible with traditional direct sequence spread spectrum systems.

SUMMARY OF THE INVENTION

Embodiments of the invention provide systems and methods for improving signal reception in chaotic communications systems. In a first embodiment of the invention, a method of recovering information encoded in a carrier modulated using a sequence of discrete-time chaotic samples and transmitted in a communications medium is provided. The method includes the step receiving a composite signal including a plurality of multi-path components, each of the plurality of multi-path components associated with a plurality of multi-path images of a transmitted signal. The method also includes the step of correlating the received composite signal with a spreading sequence using different time-offset values to generate a plurality of time-offset de-spread signals associated with at least a portion of the plurality of multi-path components, the spreading sequence based on the sequence of discrete-time chaotic samples. The method further includes the step of modifying at least a portion of the plurality of time-offset de-spread signals based at least on the time-offset values to synchronize the plurality of time-offset de-spread signals, and combining the plurality of de-spread signals into a combined coherent de-spread signal after the modifying.

In a second embodiment of the invention, a receiver in communications system is provided. The receiver includes an antenna system for receiving a composite signal including a plurality of multi-path components, each of the plurality of multi-path components associated with a plurality of multi-path images of a transmitted signal. The receiver also includes a correlation system for correlating the received composite signal with a spreading sequence using different time-offset values to generate a plurality of time-offset de-spread signals associated with at least a portion of the plurality of multi-path images, the spreading sequence based on the sequence of discrete-time chaotic samples. The receiver further includes a plurality of receiver fingers for generating a plurality of synchronized de-spread signals from the plurality of time-offset de-spread signals based at least on the time-offset values, and a combiner for combining the plurality of de-spread signals into a combined coherent de-spread signal after the modifying.

In a third embodiment of the invention, a RAKE receiver is provided. The RAKE receiver includes an antenna system for receiving a composite signal including a plurality of multi-path components, each of the plurality of multi-path components associated with a plurality of multi-path images of a transmitted signal. The RAKE receiver also includes a correlation system for correlating the received composite signal with a spreading sequence using different time-offset values to generate a plurality of time-offset de-spread signals associated with at least a portion of the plurality of multi-path images, the spreading sequence based on the sequence of discrete-time chaotic samples. The RAKE receiver further includes a plurality of RAKE receiver fingers for modifying at least a portion of the plurality of time-offset de-spread signals based at least on the time-offset values to synchronize the plurality of time-offset de-spread signals. The RAKE receiver additionally includes a controller for generating operating parameters for each of the plurality of RAKE receiver fingers and for associating each of the plurality of time-offset de-spread signals with a different one of the plurality of RAKE receiver fingers, and a combiner for combining the plurality of de-spread signals from the plurality of RAKE fingers into a combined phase coherent de-spread signal.

BRIEF DESCRIPTION OF THE DRAWINGS

Embodiments will be described with reference to the following drawing figures, in which like numerals represent like items throughout the figures, and in which:

FIGS. 3A and 3B are a block diagram of an embodiment of the receiver shown in FIG. 1 in accordance with an embodiment of the present invention.

FIG. 4 is a conceptual diagram of the chaos generators of FIGS. 2 and 3 in accordance with an embodiment of the present invention.

FIG. 5 is a flow diagram of a method for generating a chaotic sequence in accordance with an embodiment of the present invention.

DETAILED DESCRIPTION

Figure 1:
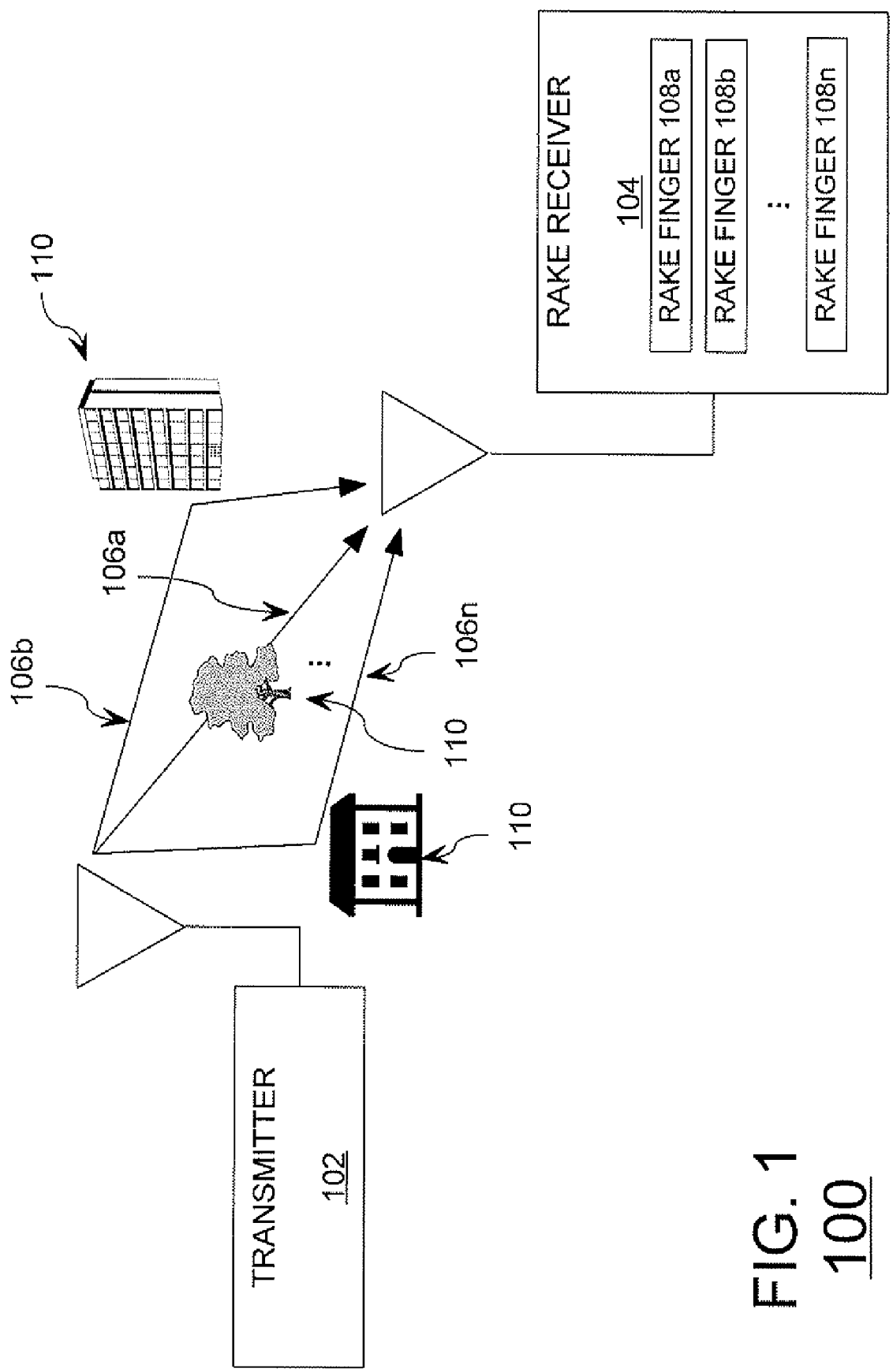
FIG. 1 is a block diagram of a coherent chaotic spread-spectrum communication system in accordance with an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention provide for a chaotic spread spectrum communication system having a receiver configured to operate as a chaotic RAKE receiver. As one of ordinary skill in the art will recognize, conventional communications systems employ RAKE receivers to combine multipath components to provide an increased signal-to-noise ratio (SNR). As previously described, conventional RAKE receivers are typically not cost effective or are difficult to implement for spread communications systems employing square pulse spreading sequences. The number of RAKE "fingers," which represent independent receive paths, helps determine the potential for SNR improvement, with successive RAKE fingers quickly resulting in diminishing signal progressing gains once the multipath images are not sufficiently above and therefore cannot be efficiently separated from the noise floor. Performance can be enhanced in some cases by coupling RAKE receivers with other signal enhancement techniques. For example, fading performance may be further improved via directional and phased array antennas.

The present inventors note that chaotic spreading waveforms with a Gaussian distribution provide signals that have an essentially impulsive autocorrelation, without extensive sidelobes, allowing better separation of multipath components. An "impulsive" autocorrelation signal, as used herein, refers to a signal that has no significant sidelobes when correlated with delayed versions of itself. Chaotic spreading waveforms with a Gaussian distribution display impulsive autocorrelations, without the sidelobes commonly observed in direct sequence spread waveforms using square-pulse spreading sequences. Thus, in the case of multi-path images, more of the multi-path components can be detected and potentially isolated and combined to reduce the effects of multipath signal fading.

The present Inventors have discovered that one method of implementing such a RAKE receiver is by using Gaussian distributed digital chaotic sequences in a coherent chaotic spread-spectrum communications system. In particular, the chaotic spread spectrum communications system utilizes a digital chaos generator. Fundamentally, chaotic spread waveforms have better autocorrelation properties than direct sequence spread waveforms. That permits better multipath image separation, which in turn gives reduced "collisions" that are collectively referred to as fading. Therefore, a chaotic RAKE receiver is more able to separate multipath images successfully, giving a better spread spectrum communications capability.

As described below, the chaotic spreading sequence provides a sequence of chips having chaotically varying values during a symbol period. Thus, the spreading sequence not only provides a spreading sequence which is secure, but the chaotic nature results in a magnitude for correlation sidelobes of any transmitted signals that are significantly reduced as compared to that of a binary sequence. This reduction of the correlation sidelobes effectively provides an impulsive signal autocorrelation, allowing a larger number of multipath components to be detected and separated. Consequently, the communications degrading effects of multipath fading is reduced in the RAKE receiver.

An embodiment of the present invention will now be described with respect to FIG. 1 through FIG. 3B. Some embodiments of the present invention provide a coherent chaotic spread-spectrum communications system for phase shift keying (PSK) symbols. The coherent chaotic spread-spectrum communications system's transmitter can be configured to generate an output signal having Gaussian distributed chaotic properties, producing an output waveform that is indistinguishable from bandlimited AWGN. It should be appreciated that such a spread-spectrum communications system disclosed herein has many advantages as compared to conventional spread-spectrum communications systems. The spread-spectrum communications system disclosed herein also has many advantages over chaos based spread spectrum systems utilizing analog based chaotic sequence generators. The spread-spectrum communications system disclosed herein corrects drift between a transmitter and a receiver without an extreme compromise of throughput.

The communication system disclosed herein utilizes a coherent chaotic sequence spread spectrum (CCSSS) method. Prior to being transmitted, data symbols are combined with a higher rate chaotic sequence (analogous to the binary PN spreading sequence known as a chipping code in traditional direct sequence spread spectrum systems) that spreads the spectrum of the data according to a spreading ratio. The resulting signal resembles a truly random signal, but this randomness can be removed at the receiving end to recover the original data. In particular, the data is recovered by de-spreading the received signal using a synchronized replica of the same chaotic sequence which is generated at a receiver. The CCSSS system in relation to FIGS. 1 through 3B channel encodes a baseband carrier with PSK symbols. The CCSSS system also modulates the phase modulated carrier in a chaotic manner utilizing a string of discrete time chaotic samples that vary in both amplitude and phase. The discrete time chaotic samples shall hereinafter be referred to as "chips". As will be appreciated by those familiar with direct sequence spread spectrum (DSSS) systems, each chip will generally have a much shorter duration than the duration of each of the information symbols. Thus it will be understood that the carrier is modulated using the chaotic sequence chips. It should also be understood that the chaotic sequence of chips which are utilized for generating the transmitted signal is known a priori by the receiver. Consequently, the same chaotic sequence can be used at the receiver to reconstruct the non-spread carrier or remove the effect of spreading at the receiver.

Referring now to FIG. 1, there is provided a coherent chaotic spread-spectrum communication system 100 according to an embodiment of the present invention. The coherent chaotic spread-spectrum communication system 100 is comprised of a transmitter 102 and a receiver 104. The transmitter 102 is configured to generate an amplitude-and-time-discrete baseband signal and to spread the amplitude-and-time-discrete baseband signal over a wide intermediate frequency band. This spreading consists of multiplying the amplitude-and-time-discrete baseband signal by a digital chaotic sequence. The product of this arithmetic operation is hereinafter referred to as a digital chaotic signal. In this regard, it should be understood that the transmitter 102 is also configured to process the digital chaotic signal to place the same in a proper analog form suitable for transmission over a communications link. The transmitter 102 is further configured to communicate analog chaotic signals to the receiver 104 via a communications link.

Typically, the transmitter 102 is configured to communicate the analog chaotic signals over a radio frequency (RF) channel. However, the transmitted chaotic signal is typically not the same as the analog chaotic signal received at the receiver. Rather, the signal typically received at the receiver 104 is a composite signal comprised of modified copies of the original analog chaotic signal plus the effects of background noise. These copies are modified due to interaction of the analog chaotic signal with the atmosphere and objects in the path between the transmitter 102 and the receiver 104. The type and magnitude of interaction varies depending on the types of objects in the path. Such interactions include reflection, diffraction, and scattering of the analog chaotic signals due to electrical reflectors, such as buildings, other antennas, and ground waves. Other objects, such as organic materials and atmospheric features, can also interact with a transmitted signal, although to a substantially lesser extent.

As a result of the interactions with objects in the signal path, a single signal corresponding to the analog chaotic signal transmitted is not typically received at the receiver 104. Rather, as shown in FIG. 1 a collection of multi-path analog chaotic signals 106a, 106b, ... 106n is received at the receiver 104. In general, these signals are received at arbitrary phase angles, varying attenuations, and signal delays, causing fading of the primary signal received at receiver 104. For example, the phase, the frequency, and propagation delay of each of multi-path analog chaotic signals 106a ... 106n may be altered with respect to the original analog chaotic signal transmitted by transmitter 102.

A RAKE receiver provides the capability to discriminate between distinct multipath images that arrive at different delays. Therefore, the receiver 104 is configured as a RAKE receiver to down convert, digitize, and de-spread at least a portion of these received multi-path analog chaotic signals 106a ... 106n. In particular, the receiver can use RAKE fingers 108a, 108b, ... 108n to selectively correlate at least some of multi-path images 106a, ... 106n, with a replica of the chaotic sequence generated at the transmitter 102. The RAKE fingers 108a ... 108n can also adjust a phase and a frequency of the selected received multi-path images 106a ... 106n to more closely match that of the originally transmitted analog chaotic signal. Additionally, each RAKE finger 108a ... 108n can adjust the timing of the selected multi-path images 106a ... 106n to account for any propagation delay based on a clock (not shown) synchronized with a clock of the transmitter 102 to ensure proper correlation to properly de-spread each of the received multi-path images 106a ... 106n. The receiver 104 is further configured to coherently combine and process the de-spread signals for obtaining data contained therein. The receiver 104 is configured to convert the data into text, sound, pictures, navigational-position information, and/or any other type of useful payload information that can be communicated. The receiver 104 is described in greater detail below in relation to FIGS. 3 and 3B.

Figure 2:
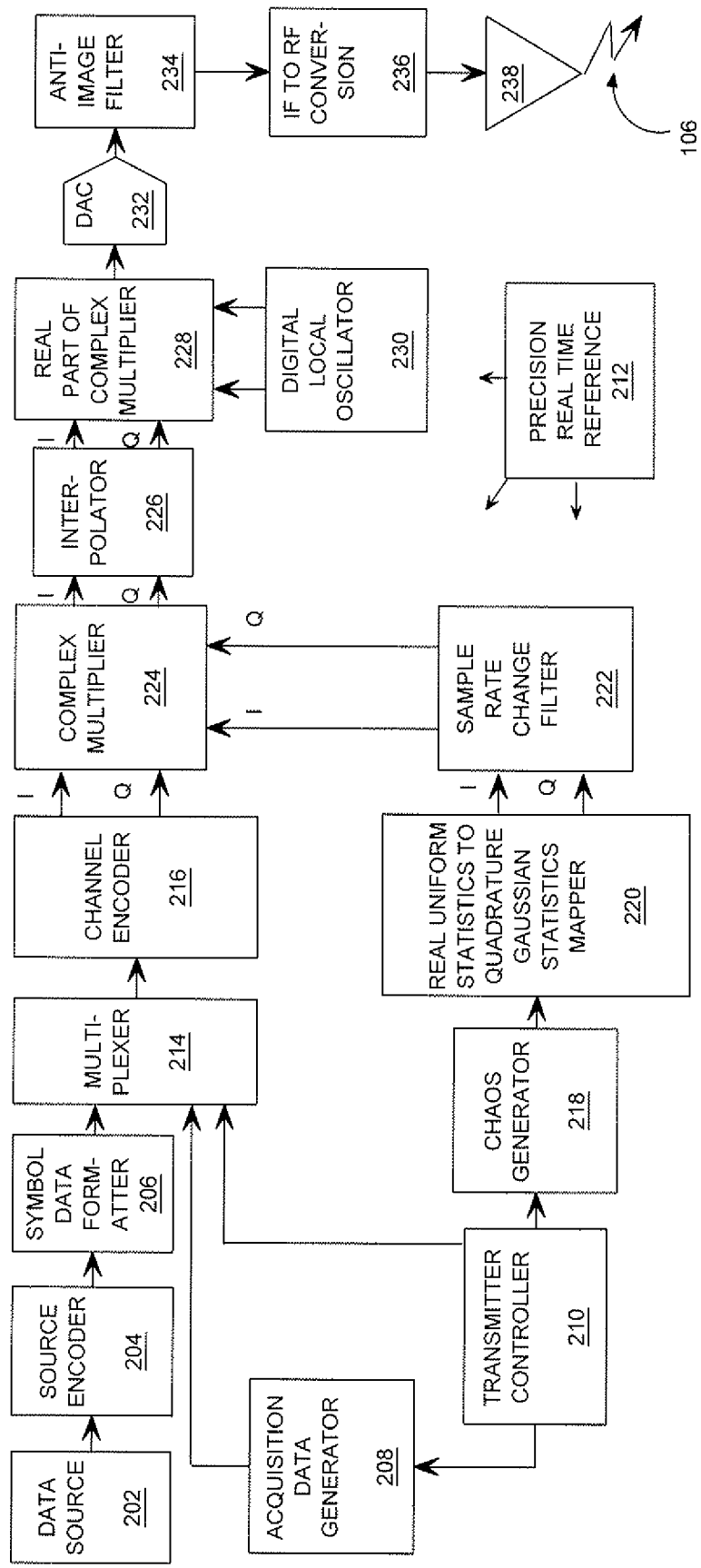
FIG. 2 is a block diagram of the transmitter shown in FIG. 1 in accordance with an embodiment of the present invention.

Referring now to FIG. 2, there is provided a block diagram of the transmitter 102 shown in FIG. 1. The transmitter 102 is comprised of a data source 202. The transmitter 102 is also comprised of a source encoder 204, a symbol data formatter 206, an acquisition data generator 208, a transmitter controller 210, a multiplexer 214, a channel encoder 216, a precision real time reference 212, and a digital complex multiplier 224. The transmitter 102 is further comprised of a chaos generator 218, a real uniform statistics to quadrature Gaussian statistics mapper device (RUQG) 220, and a sample rate change filter (SRCF) 222. The transmitter 102 is further comprised of an interpolator 226, a digital local oscillator (LO) 230, a real part of a complex multiplier 228, a digital-to-analog converter (DAC) 232, an anti-image filter 234, an intermediate frequency (IF) to radio frequency (RF) conversion device 236, and an antenna element 238.

Referring again to FIG. 2, the data source 202 is configured to receive bits of data from an external data source (not shown) as bits of data. In this regard, it should be appreciated that the data source 202 is an interface configured for receiving an input signal containing data from an external device (not shown). The data source 202 is further configured to supply bits of data to the source encoder 204 at a particular data transfer rate. The source encoder 204 can be configured to encode the data received from the external device (not shown) using a forward error correction coding scheme. The bits of data received at or generated by the source encoder 204 represent any type of information that may be of interest to a user. For example, the data can be used to represent text, telemetry, audio, or video data. The source encoder 204 is further configured to supply bits of data to the symbol data formatter 206 at a particular data transfer rate.

The symbol data formatter 206 is configured to process bits of data for forming data words for the channel encoded symbols. The source encoded symbols are phase shift keyed (PSK) encoded. The symbol data formatter 204 can also be configured to differentially encode formed PSK symbols. Differential encoding is well known to one of ordinary skill in the art and therefore will not be described in detail herein. The symbol data formatter 206 can be further configured to communicate non-differentially encoded PSK symbol data words and/or differentially encoded PSK symbol data words to the multiplexer 214. Still, the invention is not limited in this regard.

According to an embodiment of the invention, the symbol data formatter 206 is functionally similar to a serial in/parallel out shift register where the number of parallel bits out is equal to log base two ($\log_2$) of the order of the channel encoder 216. In this regard, the symbol data formatter 206 is selected for use with a quadrature phase shift keying (QPSK) channel encoder. As such, the symbol data formatter 206 is configured to perform a QPSK formatting function for grouping two (2) bits of data together to form a QPSK symbol data word (i.e., a single two bit parallel word). Thereafter, the symbol data formatter 206 communicates the encoded QPSK symbol data word to the multiplexer 214. Still, the invention is not limited in this regard.

According to additional embodiments of the invention, the symbol data formatter 206 is selected for use with other digital modulation techniques employing controlled amplitude or phase modulation. Such digital modulation techniques include a sixteen quadrature amplitude modulation (16QAM) channel encoder, a binary phase-shift keying (BPSK) channel encoder, a sixteen amplitude and phase-shift keying (APSK) channel encoder, or a more general arbitrary data signal constellation channel encoder. Other modulation techniques (such as on-off-keying, amplitude shift keying, and frequency shift keying) may also be used. Channel encoding techniques are well known to those having ordinary skill in the art, and therefore will not be described herein. As such, the symbol data formatter 206 is configured to map data bits to modulation symbol data words and then communicate the symbol data words to the multiplexer 214. Still, the invention is not limited in this regard.

The transmitter 102 also includes an acquisition data generator 208 capable of generating a "known data preamble" that can be used to facilitate initial synchronization of a chaotic sequence generated in the transmitter 102 and the receiver 104. The duration of this "known data preamble" is determined by an amount required by the receiver 104 to synchronize with the transmitter 102 under known worst case channel conditions. In some embodiments of the invention, the "known data preamble" is a repetition of the same known symbol. In other embodiments of the invention, the "known data preamble" is a series of known symbols. The acquisition data generator 208 can be further configured to communicate the "known data preamble" to the multiplexer 214.

Referring again to FIG. 2, the multiplexer 214 is configured to receive the binary word to be modulated by the channel encoder from the symbol data formatter 206. The multiplexer 214 is also configured to receive a "known data preamble" from the acquisition data generator 208. The multiplexer 214 is coupled to the transmitter controller 210. The transmitter controller 210 is configured to control the multiplexer 214 so that the multiplexer 214 routes the "known data preamble" to the channel encoder 216 at the time of a new transmission.

According to an alternative embodiment of the invention, the "known data preamble" is stored in a modulated form. In such a scenario, the architecture of FIG. 2 is modified such that the multiplexer 214 exists after the channel encoder 216. Still, the invention is not limited in this regard.

According to another embodiment of the invention, a "known data preamble" may be injected at known intervals to aid in periodic resynchronization of the chaotic sequence generated in the transmitter 102 and the receiver 104. This would typically be the case for an implementation meant to operate in harsh channel conditions. Still, the invention is not limited in this regard.

Referring again to FIG. 2, the multiplexer 214 is configured to select the symbol data words to be routed to the channel encoder 216 after a preamble period has expired. The multiplexer 214 is also configured to communicate the data words to the channel encoder 216. In this regard, it should be appreciated that a communication of the symbol data words to the channel encoder 216 is delayed by a time defined by the length of the "known data preamble." As should be appreciated, this delay allows all of a "known data preamble" to be fully communicated to the channel encoder 216 prior to communication of the data symbols.

Referring again to FIG. 2, the channel encoder 216 is configured to perform actions for representing the "known data preamble" data words and the symbol data words in the form of a modulated amplitude-and-time-discrete digital signal. The modulated amplitude-and-time-discrete digital signal is defined by digital words which represent intermediate frequency (IF) modulated symbols comprised of bits of data having a one (1) value or a zero (0) value. Methods for representing digital symbols by an amplitude-and-time-discrete digital signal are well known to one of ordinary skill in the art. Thus, such methods will not be described in detail herein. However, it should be appreciated that the channel encoder 216 can employ any such method. For example, the channel encoder 216 can be selected as a digital baseband modulator employing quadrature phase shift keying (QPSK). As will be appreciated by one of ordinary skill in the art, the output of the QPSK modulator will include an in-phase ("I") data and quadrature phase ("Q") data. The I and Q data will be thereafter communicated to the digital complex multiplier 224. As described previously, any modulation type, including those that incorporate amplitude modulation characteristics, may be implemented without limitation.

According to an embodiment of the invention, the transmitter 102 is further comprised of a sample rate matching device (not shown) between the channel encoder 216 and the digital complex multiplier 224. The sample rate matching device (not shown) is provided for synchronizing the symbol time with an integer multiple of the chaos sample time. Still, the invention is not limited in this regard.

Referring again to FIG. 2, the digital complex multiplier 224 performs a complex multiplication in the digital domain. In the digital complex multiplier 224, the amplitude-and-time-discrete digital signal from the channel encoder 216 is multiplied by a digital representation of a chaotic sequence. The chaotic sequence is generated in the chaos generator 218. The chaos generator 218 is described below with respect to FIGS. 5-7.

The rate at which the digital chaotic sequence is generated is an integer multiple of the symbol rate. The greater the ratio between the data symbol period and the chip period of the digital chaotic sequence, the higher a spreading gain. The chaos generator 218 communicates the chaotic sequence to a RUQG 220. The RUQG 220 is configured to statistically transform a digital chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, the RUQG 220 may take in two (2) uniformly distributed real inputs from the chaos generator 218 and convert those via a complex-valued bivariate Box-Muller transformation to a quadrature output having statistical characteristics of a Gaussian distribution. Such conversions are well understood by one of ordinary skill in the art, and therefore will not be described in detail herein. However, it should be understood that such techniques may use nonlinear processors, look-up tables, iterative processing (CORDIC functions), or other similar mathematical processes. The RUQG 220 is further configured to communicate transformed chaotic sequences to the SRCF 222.

The statistically transformed output of the digital chaotic sequence has a multi-bit resolution consistent with a resolution of the DAC 232. The RUQG 220 communicates the statistically transformed output of the digital chaotic sequence to the SRCF 222. For example, the RUQG 220 communicates an in-phase ("I") data and quadrature phase ("Q") data to the SRCF 222 when the channel encoder 216 is configured to yield a complex output representation. Still, the invention is not limited in this regard.

If a chaos sample rate of the transformed chaotic sequence is different than a sample rate required by subsequent signal processing, then the two rates must be matched. The chaotic sequence can therefore be resampled in the SRCF 222. For example, SRCF 222 can be comprised of real sample rate interpolation filters to upsample each of the in-phase and quadrature-phase processing paths of the chaotic sequence. As should be appreciated, the SRCF 222 performs a sample rate change on the transformed digital chaotic sequence so that a sample rate of the transformed digital chaotic sequence is the same as an amplitude-and-time-discrete digital signal required by downstream processing. The SRCF 222 is also configured to communicate a resampled, transformed digital chaotic sequence to the digital complex multiplier 224.

According to an embodiment of the invention, the RUQG 220 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical expressions (1) and (2).

$$G_1 = \sqrt{-2\log(u_1)} \cdot \cos(2\pi u_2) \quad (1)$$

$$G_2 = \sqrt{-2\log(u_1)} \cdot \sin(2\pi u_2) \quad (2)$$

where $\{u1, u2\}$ are uniformly distributed independent input random variables and $\{G_1, G_2\}$ are Gaussian distributed output random variables. In such a scenario, the SRCF 222 is comprised of one sample rate change filter to resample an in-phase ("I") data sequence and a second sample rate change filter to resample a quadrature-phase ("Q") data sequence. The SRCF 222 is configured to communicate a resampled, transformed digital chaotic sequence to the digital complex multiplier 224. More particularly, the SRCF 222 communicates an in-phase ("I") data and quadrature phase ("Q") data to the digital complex multiplier 224. Still, the invention is not limited in this regard.

According to another embodiment of the invention, the amplitude-and-time-discrete digital signal and the digital chaotic sequence are generated as zero intermediate frequency (IF) signals. Also, pulse shaping is not employed. Still, the invention is not limited in this regard.

The digital complex multiplier 224 performs a complex multiplication on the digital chaotic sequence output from the SRCF 222 and the amplitude-and-time-discrete digital channel encoded signal output from the channel encoder 216 via a sample rate matching device (not shown). The resulting output is a digital representation of a coherent chaotic sequence spread spectrum modulated IF signal in which the digital data from the channel encoder 216 has been spread over a wide frequency bandwidth in accordance with a chaotic sequence generated by the chaos generator 218.

The digital complex multiplier 224 is configured to combine a digital chaotic sequence with an amplitude-and-time-discrete digital channel encoded signal using an arithmetic operation. The arithmetic operation is selected as a complex-valued digital multiplication operation. The complex-valued digital multiplication operation includes multiplying the amplitude-and-time-discrete digital channel encoded signal by the digital chaotic sequence to obtain a digital chaotic output signal. The digital complex multiplier 224 is also configured to communicate the digital chaotic output signals to the interpolator 226.

The interpolator 226, real part of complex multiplier 228 and quadrature digital local oscillator 230 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to one of ordinary skill in the art and shall not be discussed in detail here.

The interpolator 226 accepts an input from the complex multiplier 224. In one embodiment the modulated symbols are in quadrature form and the interpolator is implemented as two real interpolators. Still, the invention is not limited in this regard.

The interpolator 226 raises the sample rate of the amplitude-and-time-discrete digital signal received from the complex multiplier 224 to a rate compatible with the bandwidth and center frequency of the second IF. The digital local oscillator 230 generates a complex quadrature amplitude-and-time-discrete digital sinusoid at a frequency which shall translate the first intermediate frequency (IF) to a desired second intermediate frequency (IF). The digital local oscillator 230 is also configured to pass its output to the real part of complex multiplier 228.

The real part of complex multiplier 228 is configured to accept as its inputs the quadrature output of the interpolator 228 and the quadrature output of the digital local oscillator 230. The real part of a complex multiplication is passed so that the real part of complex multiplier 228 implements only the real output portion of a complex multiplication. The real part of complex multiplier 228 is configured to pass its output to the DAC 232. Still, the invention is not limited in this regard.

According to an embodiment of the invention, the digital chaotic sequence and the amplitude-and-time-discrete digital signal are zero intermediate frequency (IF) signals. The digital chaotic sequence is used to amplitude modulate the "known data preamble" and the data symbols via an efficient instantiation of a complex multiplier. The result of this amplitude modulation process is a zero IF signal. Still, the invention is not limited in this regard.

Referring again to FIG. 2, the IF translator and specifically the real part of the complex multiplier 228 are configured to communicate a sampled digital chaotic output signal (i.e., a digital chaotic output signal having an increased sampling rate and non-zero center frequency) to the DAC 232. The DAC 232 is configured to convert a sampled digital chaotic output signal to an analog signal. The DAC 232 is also configured to communicate an analog signal to the anti-image filter 234.

According to an embodiment of the invention, the digital complex multiplier 224 multiplies I and Q data of an amplitude-and-time-discrete digital channel encoded signal by I and Q data of digital chaotic sequence to obtain a digital chaotic output signal. The digital chaotic output signal is a quadrature, zero IF signal. The digital complex multiplier 224 communicates the quadrature, zero IF signal to DAC 232. The DAC 232 is an interpolating DAC that increases the effective sample rate and translates a real part of the signal to a second IF. Still, the invention is not limited in this regard.

Referring again to FIG. 2, the anti-image filter 234 is configured to remove spectral images from the analog signal to form a smooth time domain signal. The anti-image filter 234 is also configured to communicate a smooth time domain signal to a RF translator 236. The RF translator 236 is a wide bandwidth analog IF to RF up converter. The RF translator 236 is configured to center a smooth time domain signal at an RF for transmission thereby forming an RF signal. The RF translator 236 is also configured to communicate the RF signal to the power amplifier (not shown). The power amplifier (not shown) is configured to amplify a received RF signal. The power amplifier (not shown) is configured to communicate the amplified RF signal to the antenna element 238 for communication to a receiver 104 (described below in relation to FIG. 3A).

It should be understood that the digital generation of the digital chaotic sequence at the transmitter 102 and receiver 104 is kept closely coordinated under the control of a precision real time references 212 and 336, respectively. The higher the precision of the references 212, 336, the closer the synchronization of the chaos generator 218 of the transmitter 102 and the chaos generator (described below in relation to FIG. 3) of the receiver 104 shall be excluding the effects of processing delay differences and channel propagation times. The use of a precision real time reference allows the states of the chaos generators to be easily controlled with accuracy.

Referring again to FIG. 2, the precision real time reference 212 is a stable local oscillator locked to a precision real time reference, such as a GPS clock receiver or a chip scale atomic clock (CSAC). The precision real time reference 212 is configured to supply a high frequency clock to the clocked logic circuits 204 through 232 while being locked to a lower frequency reference clock. The lower frequency reference clock supplies a common reference and a common real time of day reference to prevent a large drift between the states of the chaos generator 218 and the chaos generator (described below in relation to FIG. 3) of the receiver 104 over an extended time interval.

One of ordinary skill in the art will appreciate that the transmitter 102 is one architecture of a communications system transmitter. However, the invention is not limited in this regard and any other transmitter architecture can be used without limitation. For example, the transmitter 102 can include real first to second intermediate frequency (IF) translation instead of a quadrature first to second intermediate frequency (IF) translation. As another example, other architectures may employ additional chaotic sequence generators to provide a switched chaotic output or to control other aspects of the transmitter 102.

Referring now to FIG. 3A, there is provided a block diagram of the receiver 104 of FIG. 1 according to an embodiment of the present invention. The receiver 104 of FIG. 3 is designed to eliminate the drawbacks of communications systems including a RAKE receiver and using binary or digital spreading sequences. In this regard it should be appreciated that the receiver 104 includes a plurality of RAKE fingers 108a . . . 108n, as previously described, to synchronize in time, frequency, and phase two or more of the multi-path images 106a . . . 106n received at receiver 104. In particular, each of the RAKE fingers 108a . . . 108n utilizes a locally generated chaotic spreading sequence to recreate the chaotic spreading sequence providing the impulsive waveform. The RAKE fingers 108a . . . 108n, include a tracking loop for synchronizing the n multipath components 106a . . . 106n with the locally generated chaotic spreading sequence. Most significantly, each of the RAKE fingers 108a . . . 108n is configured to synchronize two (2) strings of discrete time chaotic samples (i.e., chaotic sequences) without using a constant or periodic transfer of state update information. A first string of discrete time chaotic samples is generated at the transmitter 102. A second string of discrete time chaotic samples is generated and adjusted for differences in propagation delay, frequency, and phase at the receiver 104.

Referring again to FIG. 3A, the receiver 104 is comprised of an antenna element 302, a low noise amplifier (LNA) 304, a zonal filter 306, an automatic gain control amplifier 308, a radio frequency (RF) to intermediate frequency (IF) conversion device 310, an anti-alias filter 312, and an analog-to-digital (A/D) converter 314. The receiver 104 is also comprised of a plurality of RAKE fingers 108a, 108b, . . . 108n, as previously described, for processing multi-path images 106a, 106b, . . . 106n received at antenna element 302. The receiver 104 is further comprised of chaos generator 340, real uniform statistics to quadrature Gaussian statistics mapper 342, channel encoded data acquisition store 448, a combiner 350, a hard decision device 352, a symbol to bits converter 354, and a source decoder 356. The receiver 104 is further comprised of complex multipliers 360, 362, lowpass filters 364, 366, a RAKE control correlator 368, a RAKE loop controller 370, a quadrature digital local oscillator 372, a RAKE controller 374, and a precision real time reference 376.

Figure 3B:
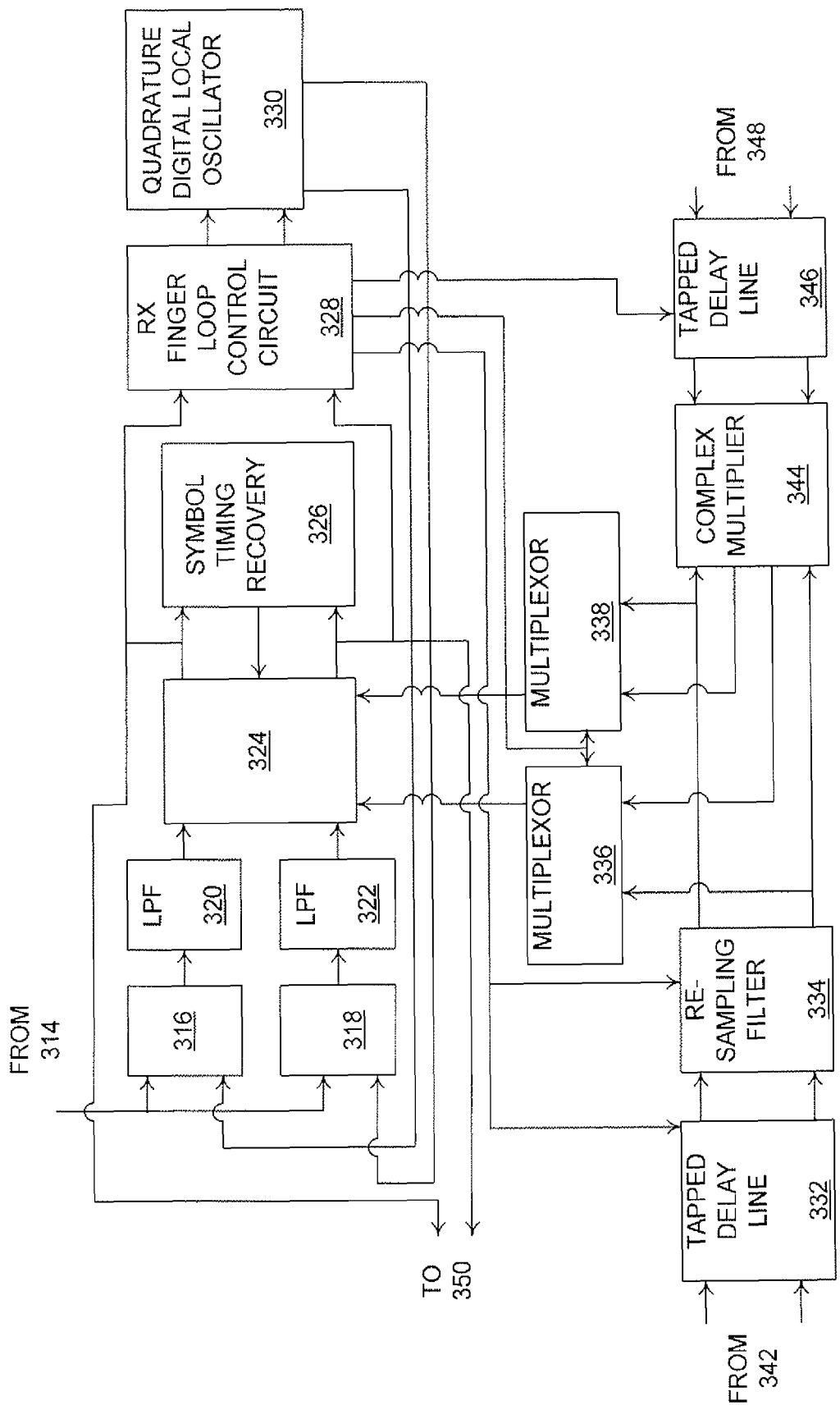

Referring now to FIG. 3B, there is provided a block diagram of a RAKE finger 108i corresponding to one of RAKE fingers 108a, 108b, . . . 108n, according to an embodiment of the present invention. RAKE finger 108i can include digital multipliers 316, 318, lowpass filters 320, 322, correlator 324, symbol timing recovery circuit 326, a receive finger loop control circuit 328, and a quadrature digital local oscillator 330. A single RAKE finger 108i can further include a first tapped delay line 332, re-sampling filter 334, multiplexors 336, 338, complex multiplier 344, and second tapped delay line 346.

Each of the above listed components and circuits 302-356, 360-376 are well known to persons skilled in the art. Thus, these components and circuits will not be described in great detail herein. However, a brief discussion of the receiver 104 architecture is provided to assist a reader in understanding the present invention. It should be noted that when the receiver 104 is in both acquisition and tracking modes (described below) the receiver 104 is utilizing a novel architecture/algorithm.

Referring again to FIG. 3A, the antenna element 302 is configured to receive an analog input signal communicated from the transmitter 102 over a communications link. The antenna element 302 is also configured to communicate the analog input signal to the LNA 304. The LNA 304 is configured to amplify a received analog input signal while adding as little noise and distortion as possible. The LNA 304 is also configured to communicate an amplified, analog input signal to the zonal filer 306. Zonal filters are analog filters with slow roll off characteristic but low injection loss used to suppress large interfering signals outside of bands of interest. Zonal filters are well known to persons skilled in the art, and therefore will not be described in great detail herein. It should be appreciated that the zonal filter 306 is configured to communicate a filtered, analog input signal to the automatic gain control (AGC) amplifier 308. An automatic gain control (AGC) amplifier 308 can be a controllable gain amplifier used to keep the magnitude of the received signal within normal bounds for the rest of the signal processing chain. Automatic gain control (AGC) amplifiers are well known to one of ordinary skill in the art, and therefore will not be described in great detail herein. It should be appreciated that the automatic gain control (AGC) amplifier 308 is configured to communicate a gain adjusted, analog input signal to the RF to IF conversion device 310.

The RF to IF conversion device 310 is configured to mix the analog input signal to a selected IF for conversion to a digital signal at the A/D converter 314. The RF to IF conversion device 310 is also configured to communicate a mixed analog input signal to the anti-alias filter 312. The anti-alias filter 312 is configured to restrict a bandwidth of a mixed analog input signal. The anti-alias filter 312 is also configured to communicate a filtered, analog input signal to the A/D converter 314. The A/D converter 314 is configured to convert a received analog input signal to a digital signal. The A/D converter 314 is also configured to communicate a digital input signal to each of the RAKE fingers 108a . . . 108n and the real multipliers 360, 362 of the RAKE control section of the receiver.

The RAKE control section of the receiver is comprised of real multipliers 360, 362, lowpass filters 364, 366, RAKE control correlator 368, RAKE loop controller 370, quadrature digital local oscillator 372, RAKE controller 374, and precision real time reference 376. Multiplier 360 receives one input from A/D converter (ADC) 314 and another input from the in-phase sinusoidal output of quadrature digital local oscillator 372. The output of multiplier 360 is sent to lowpass filter 364. Multiplier 362 receives one input from A/D converter 314 and another input from the quadrature-phase sinusoidal output of quadrature digital local oscillator 372. The output of multiplier 362 is sent to lowpass filter 366.

Lowpass filter 364 lowpass filters the output of multiplier 360. Lowpass filter 366 lowpass filters the output of multiplier 362. Lowpass filters 364 and 366 collectively filter a sideband of the output of multipliers 360, 362 to form a quadrature form of the output of A/D converter 314. The output of lowpass filters 364, 366 is passed to RAKE control correlator 368.

RAKE control correlator 368 correlates the baseband form of the received signal with the locally generated chaos to estimate the channel response during the acquisition phase and steady state demodulation phase of communication between the transmitter 102 and receiver 104. The output of the RAKE control correlator 368 is also used to as input for certain receiver control loops. The output of RAKE control correlator 368 is passed to RAKE loop controller 370 and RAKE controller 374.

RAKE loop controller 370 receives the output of RAKE control correlator 368 and calculates gain adjustments for the AGC amplifier 308 and the frequency control word for controlling the quadrature digital local oscillator 372. The RAKE loop controller 370 uses multiple peak information from the RAKE control correlator 368 to calculate loop control parameters.

The RAKE controller 374 receives input from the precision real time reference 376 and the RAKE control correlator 368. The RAKE controller 374 tasks, coordinates, and controls the RAKE fingers 108a-108n and controls the timing of the receiver's chaos generator 340. RAKE controller 374 monitors the output of RAKE control correlator 368 and assigns RAKE fingers to significant multipath components, and supplies coarse timing adjustment information to the chaos generator 340.

The precision real time reference clock 376 is a stable local oscillator locked to a precision real time reference, such as a GPS clock receiver or a chip scale atomic clock (CSAC). The precision real time reference clock 376 is configured to supply a high frequency clock to the clocked logic circuits while being locked to a lower frequency reference clock. The lower frequency reference clock supplies a common reference and a common real time of day reference to prevent a large drift between the states of the chaos generator of the transmitter 102 and the states of chaos generator 340 of the receiver 104 over an extended time interval, prior to any time delays introduced by the RAKE controller 374.

During the early stage of acquisition the control section of the RAKE receiver searches and corrects for coarse frequency and timing offsets and performs initial signal strength normalization. The control section then identifies significant multipath components in the received signal and assigns a RAKE finger to receive a component and initiate its own acquisition on the assigned component. In steady state mode, the control section monitors the received waveform for time varying characteristics including received signal strength, timing and frequency offsets, and the number of multipath components, and adjusts receiver control accordingly. For example, if a multipath component fades to a non useful amplitude level, the RAKE controller removes the finger assigned to the fading multipath component as an active input to the combiner 350. Conversely, if a new multipath component appears, the RAKE receiver control section may assign an idle finger or reassign an assigned finger to the newly appearing multipath component.

Referring now to FIG. 3B, the multiplier 316 is configured to receive a digital word as input from the A/D converter 314 in FIG. 3A and a digital word from the in-phase component of the quadrature digital local oscillator 330. The multiplier 316 multiplies the output of the A/D converter 314 by the in-phase component of the quadrature digital local oscillator 330. The multiplier 316 is also configured to communicate a digital output word. The multiplier 318 is configured to receive a digital word as input from the A/D converter 314 and a digital word from the quadrature-phase component of the quadrature digital local oscillator 330. The multiplier 318 multiplies the output of the A/D converter 314 by the quadrature-phase component of the quadrature digital local oscillator 330. The multiplier 318 is also configured to communicate a digital output word.

Real multipliers 316, 318 are part of a second IF converter which additionally includes lowpass filters 320, 322, and the programmable quadrature digital local oscillator 330. Lowpass filter 320 filters the output of multiplier 316 and lowpass filter 322 filters the output of multiplier 318. Lowpass filters 320 and 322 collectively filter a sideband of the output of multipliers 316, 318 to form a quadrature form of the output of A/D converter 314. The output of lowpass filters 320, 322 is passed to the finger correlator 324.

The quadrature digital local oscillator 330 generates a complex quadrature amplitude-and-time-discrete digital sinusoid for one of the multi-path components in the digital input signal at a frequency which shall translate the first IF to baseband and remove detected frequency and phase offsets for the one multi-path component in the resulting quadrature baseband signal. The quadrature digital local oscillator 330 accepts as its inputs a binary phase control word and a binary frequency control word, specific for the one multi-path component, from the loop control circuit 328 within RAKE finger 108i. Quadrature digital local oscillators are known to those skilled in the art, and therefore will not be described in detail herein.

The second IF converter is configured to mix the digital input signal to a selected IF for processing at the correlator 324 within RAKE finger 108$i$. The IF converter is also configured to communicate a digital input signal to the correlator 324. As will be appreciated by those skilled in the art, the output of the IF translator can include an in-phase ("I") data and quadrature phase ("Q") data. As such, the IF converter can communicate I and Q data to the correlator 324.

Referring back to FIG. 3A, the chaotic sequence is generated in the chaos generator 340. The chaos generator 340 communicates the chaotic sequence to an RUQG 342. In this regard, it should be appreciated that the chaos generator 340 is coupled to the RAKE controller 374. The RAKE controller 374 is configured to control the chaos generator 340 so that the chaos generator 340 generates a chaotic sequence with the correct initial state when the receiver 104 is in an acquisition mode and a tracking mode.

The RUQG 342 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in some embodiments is a bivariate Gaussian distribution that converts two (2) independent uniformly distributed random variables to a pair of quadrature Gaussian distributed variables. The RUQG 342 is further configured to communicate transformed chaotic sequences to the tapped delay line 332 within each RAKE finger 108$a$ ... 108$n$.

According to the embodiment of the invention, the RUQG 342 statistically transforms a digital chaotic sequence into a quadrature Gaussian form of the digital chaotic sequence. The RUQG 342 communicates the quadrature Gaussian form of the digital chaotic sequence to the re-sampling filter 344. More particularly, the RUQG 342 communicates an in-phase ("I") data and quadrature phase ("Q") data to the first tapped delay line 332, as shown in FIG. 3A. Still, the invention is not limited in this regard.

The first tapped delay line 332 is configured within a RAKE finger 108$i$ to store an a priori determined number of the most recent chaotic samples and output the sample corresponding to an integer sample time delay determined by the receive finger loop controller 328 within the RAKE finger 108$i$. The number of most recent samples stored is determined from the maximum time delay span of the multipath signal components that the RAKE receiver can combine divided by the sample time of the chaotic samples. The sample tap output by the first tapped delay line 332 is determined by the receive finger loop control circuit based on the time delay of the path it is assigned relative to the current time of the most recent sample generated by the chaos generator. Tapped delay lines are well known to those skilled in the art and therefore shall not be discussed in detail. In this regard, it should be appreciated that the first tapped delay line 332 is coupled to the receive finger loop control circuit 328 within a RAKE finger 108$i$. The receive finger loop control circuit 328 is configured to control the first tapped delay line 332 so that the tapped delay line 332 outputs a chaotic sequence with the correct initial state when the receiver 104 is in an acquisition mode and a tracking mode. The tapped delay line is also configured to forward its output to the re-sampling filter 334 within the RAKE finger 108$i$.

The re-sampling filter 334 within a RAKE finger 108$i$ receives its input from the first tapped delay line 332. The re-sampling filter 334 within a RAKE finger 108$i$ is also configured to forward a transformed chaotic sequence to the digital complex multiplier 344. The re-sampling filter 334 is configured as a sample rate change filter for making the chaos sample rate compatible with the received signal sample rate when the receiver 104 is in acquisition mode. The re-sampling filter 334 is also configured to compensate for transmit and receive clock offsets with less than a certain level of distortion when the receiver is in a steady state demodulation mode. In this regard, it should be appreciated that the re-sampling filter 334 is configured to convert a sampling rate of in-phase ("I") and quadrature-phase ("Q") data sequences from a first sampling rate to a second sampling rate without changing the spectrum of the data contained in therein. The re-sampling filter 334 is further configured to communicate in-phase ("I") and quadrature-phase ("Q") data sequences to the multiplexers 336, 338.

It should be noted that if a sampled form of a chaotic sequence is thought of as discrete samples of a continuous band limited chaos then the re-sampling filter 334 is effectively tracking the discrete time samples, computing a continuous representation of the chaotic sequence, and resampling the chaotic sequence at the discrete time points required to match the discrete time points sampled by the A/D converter 314. In effect, input values and output values of the re-sampling filter 334 are not exactly the same because the values are samples of the same waveform taken at slightly offset times. However, the values are samples of the same waveform so the values have the same power spectral density.

Referring again to FIG. 3A, the CEADG 348 is configured to generate a modulated acquisition sequence. The CEADG 348 is also configured to communicate a modulated acquisition sequence to a second tapped delay line 346 within a RAKE finger 108$i$, as shown in FIG. 3B. The second tapped delay line 346 within a RAKE finger 108$i$ is configured to store an a priori determined number of the most recent CEADG 348 output samples. The number of most recent samples stored is determined from the maximum time delay span of the multipath signal components that the RAKE receiver can combine divided by the sample time of the CEADG 348 samples. The sample tap output by the second tapped delay line 346 is determined by the receive finger loop control circuit based on the time delay of the path it is assigned relative to the current time of the most recent sample generated by the chaos generator. Tapped delay lines are well known to those skilled in the art and therefore shall not be discussed in detail. In this regard, it should be appreciated that the second tapped delay line 346 is coupled to the receive finger loop control circuit 328 within a RAKE finger 108$i$. The receive finger loop control circuit 328 is configured to control the second tapped delay line 346 so that the tapped delay line 346 outputs a channel encoded acquisition data sequence with the correct states when the receiver 104 is in an acquisition mode. The tapped delay line is also configured to forward its output to complex multiplier 344 within the RAKE finger 108$i$.

The digital complex multiplier 344 in a RAKE finger 108$i$ is configured to perform a complex multiplication in the digital domain. This complex multiplication includes multiplying a modulated acquisition sequence from the CEADG 348 by a digital representation of a chaotic sequence to yield a reference for a digital input signal. The digital complex multiplier 344 is also configured to communicate reference signal to the multiplexers 336, 338 within the RAKE finger 108$i$. The multiplexer 336 is configured to route the quadrature-phase part of a reference signal to the correlator 324. The multiplexer 338 is configured to route the in-phase part of a reference signal to the correlator 324. In this regard, it should be appreciated that the multiplexers 336, 338 are coupled to the receive finger loop control circuit 328. The receive finger loop control circuit 328 is configured to control the multiplexers 336, 338 in tandem so that the multiplexers 336, 338 route the reference signal to the correlator 324 while the receiver 104 is in an acquisition mode (described below).

The correlator 324 within a RAKE finger 108$i$ is configured to focus the correlation of the chaotic sequence with one of the multi-path components in the digital input signal. In this regard, it should be understood that, the value and sense of the real and imaginary components of the correlation is directly related to the values of the real and imaginary components of the symbols of the one multipath component of the digital input signal that is being tracked within the RAKE finger 108$i$. It should also be understood that in steady state tracking conditions, in some embodiments, the sense of the real and imaginary components of the path correlation is directly related to the values of the real and imaginary components of the PSK symbols of the multi-path component. Thus, when the receiver 104 is in a steady state demodulation mode the output of the correlator 324 is PSK symbol soft decisions for the multipath component being tracked within the RAKE finger 108$i$. In this regard, it should be appreciated that soft information refers to soft-values (which are represented by soft-decision bits) that comprise information about the bits contained in a sequence. In particular, soft-values are values that represent the probability that a particular bit in a sequence is either a one (1) or a zero (0). For example, a soft-value for a particular bit can indicate that a probability of a bit being a one (1) is p(1)=0.3. Conversely, the same bit can have a probability of being a zero (0) which is p(0)=0.7.

The correlator 324 within a RAKE finger 108$i$ is also configured to communicate PSK soft decisions to the combiner 350 in FIG. 3A. As shown in FIG. 3A, the combiner 350, obtains the coherent sum of the soft decisions produced by each of the RAKE fingers 108$a$ . . . 108$n$. Since each RAKE finger 108$a$ . . . 108$n$ produces correlated signals that are synchronized in phase and are adjusted for propagation delays, the sum from the combiner 350 produces a signal that effectively increases signal strength and provides an improved SNR. One of ordinary skill in the art will recognize that the combiner 350 can combine the soft decisions from the RAKE fingers 108$a$ . . . 108$n$ in any number of ways depending on the overall receiver control configuration. For example, in some embodiments, the different outputs from each of the RAKE fingers 108$a$ . . . 108$n$ can be weighted equally. In other embodiments, the different outputs from each of the RAKE fingers 108$a$ . . . 108$n$ can be weighted differently by estimating weights which maximize the Signal-to-Noise Ratio (SNR) of the combined output. Such weights can be calculated within the combiner 350 or within another component, such as RAKE controller 374, receiving the outputs from the different RAKE fingers 108$a$ . . . 108$n$.

The sum from the combiner 350 is then provided to the hard decision device 352 for final symbol decision making. The hard decision device 352 is configured to communicate symbol decisions to the S/B converter 354. The S/B converter 354 is configured to convert symbols to a binary form. The S/B converter 354 is configured to communicate a binary data sequence to the source decoder 356. The source decoder 356 is configured to decode FEC applied at the transmitter and to pass the decoded bit stream to one or more external devices (not shown) utilizing the decoded data.

Referring back to FIG. 3B, the correlator 324 within a RAKE finger 108$i$ is also configured direct its output to a symbol timing recovery circuit 326 and a receive finger loop control circuit 328. In steady state mode, the symbol timing recovery circuit 326 within a RAKE finger 108$i$ is configured to calculate and track symbol onset and duration information and to translate this information into a correlator control signal passed back to the correlator 324 to control the onset and duration of each steady state correlation.

The receiver finger loop control circuit 328 within a RAKE finger 108$i$ is also configured to supply overall control to the RAKE finger including information associated with a chaotic sequence, initial timing associated with a data sequence and to track phase and frequency offset information between the chaotic sequence and one of the multi-path components in the digital input signal. The receive finger loop control circuit 328 is also configured to receive input signal magnitude information between the chaotic sequence and a digital input signal, relative phase and propagation delay information for each of the multi-path components being extracted from the input digital signal, and receiver mode information from the RAKE controller 368. The receive finger loop control circuit 328 uses this information and information from the correlator 324 within the RAKE finger 108$i$ to correct the multi-path component phase and timing prior to providing the PSK soft decision to the combiner 350. Acquisition of timing information and tracking of input signal magnitude, phase and frequency offset information are both standard functions in digital communication systems. As such, methods for acquiring initial timing information and tracking phase and frequency offset information are well known to persons skilled in the art, and therefore will not be described in detail herein. However, it should be appreciated that any such method can be used without limitation.

The receive finger loop control circuit 328 also uses the information provided by RAKE controller 374, as shown in FIG. 3A, to calculate the deviation of the phase and frequency and to synchronize a time-delayed chaotic sequence with the digital input signal in order to extract one of the multipath components. The loop control circuit 328 is also configured to communicate the phase and frequency offset information to the quadrature digital local oscillator 330 portion of the IF converter. The receive finger loop control circuit 328 is further configured to communicate a retiming control signal to the re-sampling filter 334 and the tapped delay lines 332, 346 within a RAKE finger 108$i$.

It should be understood that the digital generation of the digital chaotic sequence at the transmitter 102 and the receiver 104 is kept closely coordinated under the control of a precision real time reference clock 376 generating signals for the RAKE controller 374 and each of the RAKE fingers 108$a$ . . . 108$n$, as shown in FIG. 3A. The higher the precision of the clock 376, the closer the synchronization, accounting for time delays specified by the RAKE controller 374, of the chaos generator 218 of the transmitter 102, as shown in FIG. 2, and the chaos generator 340 of the receiver 104, excluding the effects of processing delay differences and channel propagation times. It is the use of digital chaos generators 218, 340 that allow the states of the chaos generators to be easily controlled with precision, thus allowing coherent communication.

The operation of the RAKE receiver 104 will now be briefly described with regard to an acquisition mode and a steady state demodulation mode. For purposes of the following discussion, it is understood that the structure of RAKE fingers 108$a$, 108$b$, . . . 108$n$ in FIG. 3A is the structure of RAKE finger 108$i$ shown in FIG. 3B. However, this particular structure is presented for illustrative purposes only. One of ordinary skill in the art will recognize that other structures for RAKE fingers 108$a$, 108$b$, . . . 108$n$ can be used in the various embodiments of the invention.

Acquisition Mode:

In acquisition mode, a single RAKE finger is initially enabled. The tapped delay lines 332, 346 of the enabled finger are set to a nominal delay value. The re-sampling filter 334 performs a rational rate change and forwards a transformed chaotic sequence to the digital complex multiplier 344. The CEADG 350 generates a modulated acquisition sequence and forwards the same to the digital complex multiplier 344. The digital complex multiplier 344 performs a complex multiplication in the digital domain. In the digital complex multiplier 344, a modulated acquisition sequence from the CEADG 350 is multiplied by a digital representation of a chaotic sequence to yield a reference for a digital input signal that was generated at the transmitter 102 to facilitate initial acquisition. The chaotic sequence is generated in the chaos generator 340. The digital complex multiplier 344 communicates a reference signal to the multiplexers 336, 338. The multiplexers 336, 338 route the reference signal to the correlator 324. The correlator 324 is transitioned into a search mode. In this search mode, the correlator 324 searches across a correlation window to locate a received signal state so that the chaos generator 340 can be set with the time synchronized state vector.

Initial acquisition is based on the dominant multipath signal component. Once the initial acquisition phase is complete, all offset and state information is transferred to the RAKE control section of the receiver. The rake control correlator 368 then commences operation in acquisition mode and transfers correlation results to the RAKE controller 374 which assigns RAKE fingers 108a, 108b, . . . 108n to identified multipath components.

The tapped delay lines 332, 346 within each RAKE finger 108a, 108b, . . . 108n are set to a nominal delay value determined by the RAKE controller 374. The re-sampling filter 334 within each RAKE finger 108a, 108b, . . . 108n performs a rational rate change and forwards a transformed chaotic sequence to the digital complex multiplier 344. The CEADG 350 continues to generate a modulated acquisition sequence and forwards the same to the digital complex multiplier 344 within each RAKE finger 108a, 108b, . . . 108n. The digital complex multiplier 344 performs a complex multiplication in the digital domain. In the digital complex multiplier 344, the continuation of a modulated acquisition sequence from the CEADG 350 is multiplied by a digital representation of a chaotic sequence to yield a reference for a digital input signal that was generated at the transmitter 102 to facilitate initial acquisition. The chaotic sequence is a continuation of the sequence generated in the chaos generator 340 which was synchronized during the end of the first acquisition phase. The digital complex multiplier 344 communicates a reference signal to the multiplexers 336, 338 within each RAKE finger 108a, 108b, . . . 108n. The multiplexers 336, 338 route the reference signal to the correlator 324. The correlator 324 is transitioned into a search mode within each RAKE finger 108a, 108b . . . 108n. In this search mode, the correlator 324 searches across a reduced correlation window to locate a received signal state so that the tapped delay line 332 and re-sampling filter 334 within each RAKE finger 108a, 108b . . . 108n can be set to time synchronize the chaotic sequence with the assigned multipath component within each RAKE finger 108a . . . 108n.

Steady State Demodulation Mode:

In steady state demodulation mode, the RAKE control correlator 368 tracks the correlation between the received modulated signal and the locally generated chaos centered close to the nominal mean location of all of the tracked multipath peaks to track the paths of interest as a function of time. This information is passed to the RAKE controller 374 which assigns fingers to paths and passes current operating parameters to fingers as they are assigned to new paths. The RAKE controller 374 also uses the nominal mean location of all of the tracked multipath peaks to track the paths of interest as a function of time to synchronize the state of the chaos generator 340. The RAKE control correlator 368 also passes correlation information to the RAKE loop controller 370. The RAKE loop controller uses the nominal mean location of all of the tracked multipath peaks to track the paths of interest as a function of time to adjust the center frequency of the quadrature digital local oscillator to keep the second IF entering the RAKE control correlator within nominal bounds for steady state operation. The RAKE loop controller 370, applies appropriate algorithmic processing to this information to extract frequency offset and magnitude compensation information.

In steady state demodulation mode, the correlator 324 tracks the correlation between the received modulated signal and the locally generated chaos close to the nominal correlation peak to generate magnitude and phase information as a function of time. This information is passed to the receive finger loop control circuit 328 and the symbol timing recovery circuit 326. The receive finger loop control circuit 328 applies appropriate algorithmic processing to this information to extract phase offset, frequency offset, and timing offset information.

Each correlator 324 also passes its output information, based on correlation times terminated by symbol boundaries, to the combiner 350. The combiner forms a composite soft decision by combining the outputs of all active finger correlators 324 within each RAKE finger 108a . . . 108n. The combiner 350 passes the combined soft decision to the hard decision block 352. The hard decision block 352 compares the correlation information to pre-determined thresholds to make hard symbol decisions. The receive finger loop control circuit 328 monitors the output of the correlator 324 and the RAKE controller 374. When the receive finger loop control circuit 328 detects fixed correlation phase offsets, the phase control of the quadrature digital local oscillator 330 is modified to remove the phase offset. When the loop control circuit 328 detects phase offsets that change as a function of time, it adjusts the tapped delay line 332 and the re-sampling filter 334 which acts as an incommensurate re-sampler when the receiver 104 is in steady state demodulation mode or the frequency control of the quadrature digital local oscillator 330 is modified to remove frequency or timing offsets. When the correlator's 324 output indicates that the received digital input signal timing has "drifted" more than plus or minus a half (½) of a sample time relative to a locally generated chaotic sequence, the receive finger loop control circuit 328: (1) informs the RAKE controller 374; (2) advances or retards the selected output tap of the tapped delay line 332 by one tap; and (3) adjusts the re-sampling filter 334 to compensate for the time discontinuity. Concurrently, the symbol timing recovery circuit 326 adjusts a correlation window in an appropriate direction by one sample time. This loop control process keeps the chaos generator 218 of the transmitter 102 and the chaos generator 340 of the receiver 104 synchronized to within half (½) of a sample time.

To enable the more precise temporal synchronization required to enhance performance, the re-sampling filter can be implemented as a member of the class of polyphase fractional time delay filters. This class of filters is well known to persons skilled in the art, and therefore will not be described in great detail herein.

As described above, a number of chaotic samples are combined with an information symbol at the transmitter 102. Since the transmitter 102 and receiver 104 timing are referenced to two (2) different precision real time reference clocks 212, 376, symbol timing must be recovered at the receiver 104 to facilitate robust demodulation. Symbol timing recovery can include: (1) computing multiple concurrent correlations with temporal offsets around the assumed nominal symbol time and duration in correlator 324; (2) storing the values, the maximum absolute values of the running averages, and the time of occurrence in the symbol timing recovery circuit 326; and (3) statistically combining the values at the symbol timing recovery circuit 326 to recover symbol timing. It should be noted that symbol timing recovery can also be accomplished via separate moving average calculations. As should be appreciated, using a separate multiplier operation for this purpose is functionally equivalent to processing multiple correlation windows simultaneously.

In this steady state demodulation mode, the symbol timing recovery circuit 326 communicates a symbol onset timing to the correlator 324 for controlling an initiation of a symbol correlation. The correlator 324 correlates a locally generated chaotic sequence with a received digital input signal during a symbol duration. In this regard, it should be understood that, the sense and magnitude of a real and imaginary components of the correlation is directly related to the values of the real and imaginary components of symbols of a digital input signal. Accordingly, the correlator 324 generates symbol soft decisions. The correlator 324 communicates the symbol soft decisions to the combiner 350 which generates a composite soft decision. The combiner 350 passes the combined soft decision to the hard decision device 352 for final symbol decision making. The hard decision device 352 determines symbols using the composite symbol soft decisions. Thereafter, the hard decision device 352 communicates the symbols to the S/B converter 354. The S/B converter 354 converts the symbol decisions to a binary form. The S/B converter 354 is configured to communicate a binary data sequence to the source decoder 356. The source decoder 356 is configured to decide FEC applied at the transmitter 102 and pass the decoded bit stream to one or more external devices (not shown) utilizing the decoded data.

One of ordinary skill in the art will appreciate that the receiver 104 is one architecture of a communications system receiver. However, the invention is not limited in this regard and any other receiver architecture can be used without limitation.

For example, in some embodiments, an adaptive correlator architecture can be used in acquisition mode. In such embodiments, the correlator 368 can be configured to use a combination of high resolution and low resolution correlation iteration steps to perform the correlation of the various spread signals. In an exemplary adaptive correlation method, a first iteration of a low-resolution correlation can be performed in which a first N sets of received signal samples are selected from a received signal and a first set of reference samples are selected from an internally generated or stored sample sequence. Each of said first N sets of received signal samples are then concurrently compared with the first set of reference samples to determine if a sufficient correlation exists between the same. Afterwards, if it is determined in said low-resolution correlation that a sufficient correlation exists between at least one of said first N sets of received signal samples and said first set of reference samples, a higher-resolution correlation can be performed, otherwise the low resolution correlation is repeated. Once initial acquisition is complete, this processes can repeated in each of the active fingers 108a, 108b, . . . , 108n to acquire each of the multipath components.

Chaos Generators and Digital Chaotic Sequence Generation

One aspect of the invention provides for a digitally generated chaotic sequence for spectrally spreading data symbols by generating a sequence of chaotic chips. In this regard, it should be appreciated that the presence of any discernible pattern in a chaotic spreading sequence is much more difficult to identify as compared to patterns that emerge over time with conventional pseudo-random number sequences. As such, a chaotic spreading sequence is characterized by a greater degree of apparent randomness as compared to these conventional pseudo-random number sequences, providing a higher degree of security.

Referring now to FIG. 4, there is provided a conceptual diagram of a chaotic sequence generator 400 in accordance with the various embodiments of the invention. As shown in FIG. 4, generation of the chaotic sequence begins at a processing devices $402_0, \ldots, 402_{N-1}$ where N polynomial equations $f_0(x(nT)), \ldots, f_{N-1}(x(nT))$ are selected. The N polynomial equations $f_0(x(nT)), \ldots, f_{N-1}(x(nT))$ can be selected as the same polynomial equation or as different polynomial equations. In the various embodiments of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field. For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT))\cdot h(x(nT))$.

As will be understood by one of ordinary skill in the art, each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to one of ordinary skill in the art. Thus, such operations will not be described in great detail herein. However, it should be appreciated that a RNS residue representation for some weighted value "a" can be defined by mathematical Equation (3).

$$R=\{a \text{ modulo } m_0, a \text{ modulo } m_1, \ldots, a \text{ modulo } m_{N-1}\} \quad (3)$$

where R is a RNS residue N-tuple value representing a weighted value "a". Further, R(nT) can be a representation of the RNS solution of a polynomial equation $f(x(nT))$ defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as an RNS residue value uses a different prime number $p_0, p_1, \ldots, p_{N-1}$ as a moduli $m_0, m_1, \ldots, m_{N-1}$.

Those of ordinary skill in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (4).

$$f(x(nT)) = Q(k)x^3(nT) + R(k)x^2(nT) + S(k)x(nT) + C(k,L) \qquad (4)$$

where n is a sample time index value. k is a polynomial time index value. L is a constant component time index value. T is a fixed constant having a value representing a time increment. Q, R, and S are coefficients that define the polynomial equation $f(x(nT))$. C is a coefficient of $x(nT)$ raised to a zero power and is therefore a constant for each polynomial characteristic. In one embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)) \ldots f_{N-1}(x(nT))$ are identical exclusive of a constant value C. For example, a first polynomial equation $f_0(x(nT))$ is selected as $f_0(x(nT)) = 3x^3(nT) + 3x^2(nT) + x(nT) + C_0$. A second polynomial equation $f_1(x(nT))$ is selected as $f_1(x(nT)) = 3x^3(nT) + 3x^2(nT) + x(nT) + C_1$. A third polynomial equation $f_2(x(nT))$ is selected as $f_2(x(nT)) = 3x^3(nT) + 3x^2(nT) + x(nT) + C_2$, and so on. Each of the constant values $C_0, C_1, \ldots, C_{N-1}$ is selected to produce an irreducible form in a residue ring of the stated polynomial equation $f(x(nT)) = 3x^3(nT) + 3x^2(nT) + x(nT) + C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following table:

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |

TABLE 1-continued

| Moduli values $m_0, m_1, \ldots, m_{N-1}$: | Sets of constant values $C_0, C_1, \ldots, C_{N-1}$: |
|---|---|
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 4 will depend on the quantity of polynomial equations N and the modulus values $m_0, m_1, \ldots, m_{N-1}$ selected for the RNS number systems. In particular, this value can be calculated as the product $M = m_0 \cdot m_1 \cdot m_3 \cdot m_4 \cdot \ldots \cdot m_{N-1}$.

Referring again to FIG. 4, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical Equation (5).

$$BL = \text{Ceiling}[\text{Log } 2(m)] \qquad (5)$$

where m is selected as one of moduli $m_0, m_1, \ldots, m_{N-1}$. Ceiling[u] refers to a next highest integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3{,}563{,}762{,}191{,}059{,}523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of M times T seconds, i.e, a sequence repetition times an interval of time between the computation of each values in the sequence of generated values. Still, the invention is not limited in this regard.

Referring again to FIG. 4, the generation of a chaotic sequence continues with mapping operation performed by a mapping device 404. The mapping operations involve mapping the RNS solutions Nos. 1 through N to a weighted number system representation to form a chaotic sequence output. The phrase "weighted number system" as used herein refers to a number system other than a residue number system. Such weighted number systems include, but are not limited to, an integer number system, a binary number system, an octal number system, and a hexadecimal number system.

In some embodiments of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. In other embodiments of the invention, the RNS solutions Nos. 1 through N are mapped to a weighted number system representation by identifying a number in the weighted number system that is defined by the RNS solutions Nos. 1 through N. According to yet another embodiment of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

In some embodiments of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] *See Residue Arithmetic and Its Applications To Computer Technology*, written by Nicholas S. Szabo & Richard I. Tanaka, McGraw-Hill Book Co., New York, 1967. [In a mixed-radix number system,] "a number x may be expressed in a mixed-radix form:

$$x = a_N \prod_{i=1}^{N-1} R_i + \ldots + a_3 R_1 R_2 + a_2 R_1 + a_1 \qquad (6)$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed order of decreasing significance." See Id. "The multipliers of the digits $a_i$ are the mixed-radix weights where the weight of $a_i$ is $$\prod_{j=1}^{i-1} R_j \text{ for } i \neq 1 \text{."  See Id.} \qquad (7)$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i. \qquad (8)$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1 \qquad (9)$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1 \qquad (10)$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x - a_1$ in its residue code. The quantity $x - a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[x = a_N \prod_{i=1}^{N-1} m_i + \ldots + a_3 m_1 m_2 + a_2 m_1 + a_1\right] \quad (11)$$

shows then that x is $a_2$. In this way, by successive subtracting and dividing in residue notation, all of the mixed-radix digits may be obtained." See Id.

"It is interesting to note that $$a_1 = \langle x \rangle_{m_1}, \quad (12)$$

$$a_2 = \left\langle \left\lfloor \frac{x}{m_1} \right\rfloor \right\rangle_{m_2},$$

$$a_3 = \left\langle \left\lfloor \frac{x}{m_1 m_2} \right\rfloor \right\rangle_{m_3}$$

and in general for i>1

$$a_i = \left\langle \left\lfloor \frac{x}{m_1 m_2 \ldots m_{i-1}} \right\rfloor \right\rangle_{m_i}." \quad (13)$$

See Id. From the preceding description it is seen that the mixed-radix conversion process is iterative. The conversion can be modified to yield a truncated result. Still, the invention is not limited in this regard.

In some embodiments of the invention, a Chinese remainder theorem (CRT) arithmetic operation is used to map the RNS solutions Nos. 1 through N to a weighted number system representation. The CRT arithmetic operation can be defined by a mathematical Equation (14).

$$Y(nT) = \quad (14)$$

$$\left\{ \left[ \langle (3x_0^3(nT) + 3x_0^2(nT) + x_0(nT) + C_0)b_0 \rangle_{p_0} \right] \frac{M}{p_0} + \ldots + \left[ \langle (3x_{N-1}^3(nT) + 3x_{N-1}^2(nT) + x_{N-1}(nT) + C_{N-1})b_{N-1} \rangle_{p_{N-1}} \right] \frac{M}{p_{N-1}} \right\}_M$$

where Y(nT) is the result of the CRT arithmetic operation. n is a sample time index value. T is a fixed constant having a value representing a time interval or increment. $x_0$–$x_{N-1}$ are RNS solutions Nos. 1 through N. $p_0, p_1, \ldots, p_{N-1}$ are prime number moduli. M is a fixed constant defined by a product of the relatively prime numbers $p_0, p_1, \ldots p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left(\frac{M}{p_j}\right)^{-1} \bmod p_j. \quad (15)$$

The $b_j$'s enable an isomorphic and equal mapping between an RNS N-tuple value representing a weighted number and said weighted number. However without loss of chaotic properties, the mapping need only be unique and isomorphic. As such, a weighted number x can map into a tuple y. The tuple y can map into a weighted number z. The weighted number x is not equal to x as long as all tuples map into unique values for z in a range from zero (0) to M−1. Therefore, in some embodiments of the invention, all $b_j$'s can be set equal to one or more values without loss of the chaotic properties. Different values of $b_j$ apply a bijective mapping within the RNS, but do not interfere with the CRT combination process.

The chaotic sequence output Y(nT) can be expressed in a binary number system representation. As such, the chaotic sequence output Y(nT) can be represented as a binary sequence. Each bit of the binary sequence has a zero (0) value or a one (1) value. The chaotic sequence output Y(nT) can have a maximum bit length (MBL) defined by a mathematical Equation (16).

MBL=Ceiling[Log 2(M)] (16)

where M is the product of the relatively prime numbers $p_0, p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. Accordingly, the CRT arithmetic operation generates a chaotic numerical sequence with a periodicity equal to the inverse of the dynamic range M. The dynamic range requires a Ceiling[Log 2(M)] bit precision.

In some embodiments of the invention, M equals three quadrillion five hundred sixty-three trillion seven hundred sixty-two billion one hundred ninety-one million fifty-nine thousand five hundred twenty-three (3,563,762,191,059,523). By substituting the value of M into Equation (8), the bit length (BL) for a chaotic sequence output Y expressed in a binary system representation can be calculated as follows: BL=Ceiling[Log 2(3,563,762,191,059,523)=52 bits. As such, the chaotic sequence output Y(nT) is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, the chaotic sequence output Y(nT) can be a binary sequence representing a truncated portion of a value between zero (0) and M−1. In such a scenario, the chaotic sequence output Y(nT) can have a bit length less than Ceiling[Log 2(M)]. It should be noted that while truncation affects the dynamic range of the system it has no effect on the periodicity of a generated sequence.

As one of ordinary skill in art will recognize, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (4) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1 \text{ ms}))=3x^3((n-1)\cdot 1 \text{ ms})+3x^2((n-1)\cdot 1 \text{ ms})+x((n-1)\cdot 1 \text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Referring now to FIG. 5, there is provided a flow diagram of an exemplary method 500 for generating a chaotic sequence according to an embodiment of the invention. As shown in FIG. 5, the method 500 begins with step 502 and continues with step 504. In step 504, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 504, step 506 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 508, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 506. It should also be appreciated that a different modulus must be selected for each polynomial equation $f_0(x(nT)), \ldots, f_{N-1}(x(nT))$.

As shown in FIG. 5, the method 500 continues with step 510. In step 510, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 506 for generating an irreducible form of the respective polynomial equation $f_0(x(nT)), \ldots, f_{N-1}(x(nT))$.

After step 510, the method 500 continues with step 512. In step 512, a value for time increment "T" is selected. Thereafter, an initial value for "x" is selected. In this regard, it should be appreciated that the initial value for "x" can be any value allowable in a residue ring. Subsequently, step 516 is performed where RNS arithmetic operations are used to iteratively determine RNS solutions for each of the stated polynomial equations $f_0(x(nT)), \ldots, f_{N-1}(x(nT))$. In step 518, a series of digits in a weighted number system are determined based in the RNS solutions. This step can involve performing a mixed radix arithmetic operation or a CRT arithmetic operation using the RNS solutions to obtain a chaotic sequence output.

After step 518, the method 500 continues with a decision step 520. If a chaos generator is not terminated (220:NO), then step 524 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 516. Subsequently, the method 500 returns to step 516. If the chaos generator is terminated (220:YES), then step 522 is performed where the method 500 ends.

One of ordinary skill in the art will appreciate that the method 500 is only one exemplary method for generating a chaotic sequence. However, the invention is not limited in this regard and any other method for generating a chaotic sequence can be used without limitation.

Figure 6:
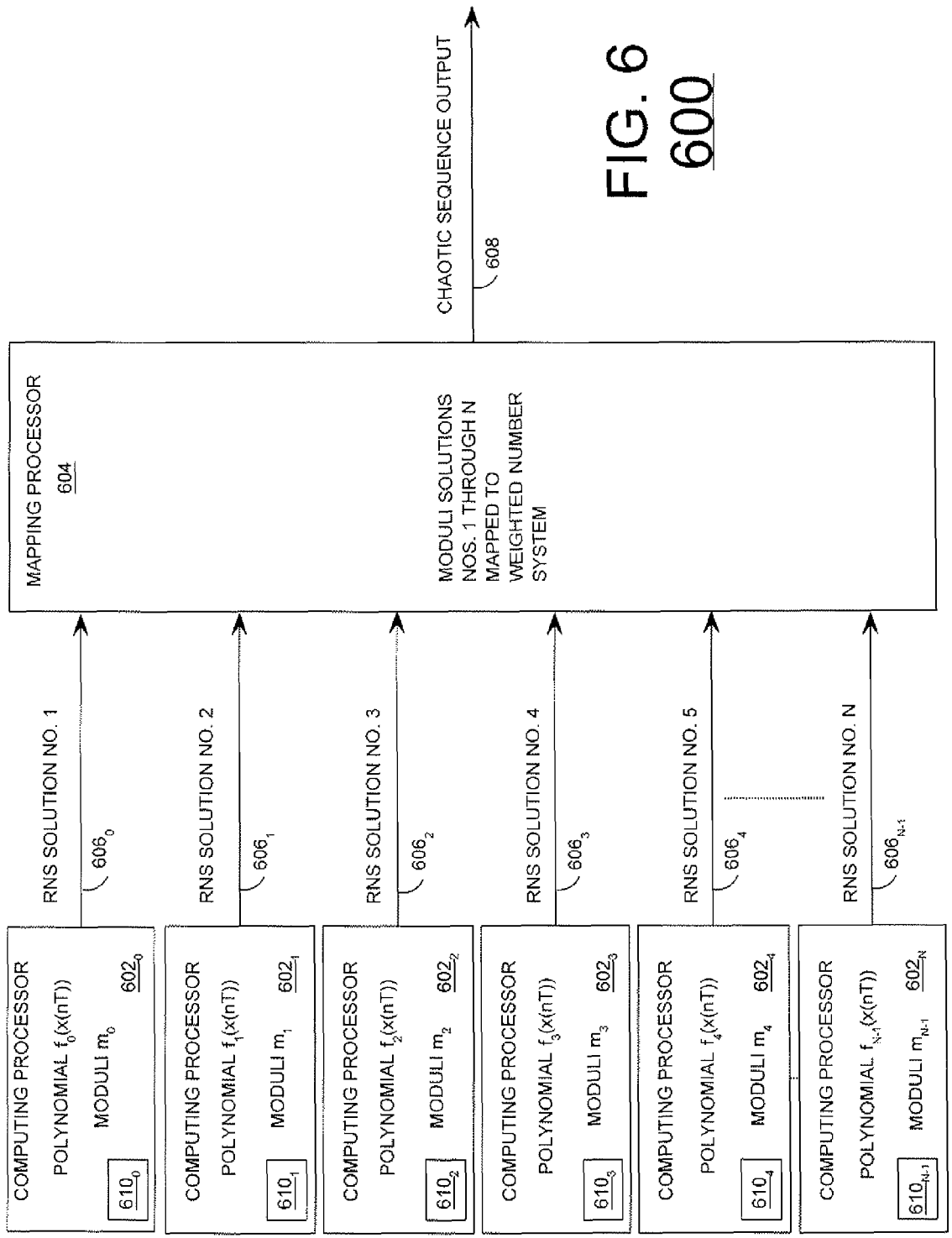
FIG. 6 is a block diagram of the chaos generator of FIG. 2 in accordance with an embodiment of the present invention.

Referring now to FIG. 6, there is illustrated an exemplary chaotic sequence generator 600 in accordance with an embodiment of the invention. The chaotic sequence generator 600 is comprised of hardware and/or software configured to generate a digital chaotic sequence. In this regard, it should be appreciated that the chaotic sequence generator 600 is comprised of computing processors $602_0\text{-}602_{N-1}$. The chaotic sequence generator 600 is also comprised of a mapping processor 604. Each computing processor $602_0\text{-}602_{N-1}$ is coupled to the mapping processor 604 by a respective data bus $606_0\text{-}606_{N-1}$. As such, each computing processor $602_0\text{-}602_{N-1}$ is configured to communicate data to the mapping processor 604 via a respective data bus $606_0\text{-}306_{N-1}$. The mapping processor 604 can be coupled to an external device (not shown) via a data bus 608. In this regard, it should be appreciated that the external device (not shown) includes, but is not limited to, a cryptographic device configured to combine or modify a signal in accordance with a chaotic sequence output.

Referring again to FIG. 6, the computing processors $602_0\text{-}602_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $602_0\text{-}602_{N-1}$ employ modulo operations to calculate a respective solution for each polynomial equation $f_0(x(nT)), \ldots, f_{N-1}(x(nT))$ using modulo based arithmetic operations. Each of the computing processors $602_0\text{-}602_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $602_0\text{-}602_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $602_0\text{-}602_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $610_0\text{-}610_{N-1}$ are chaotic. In this regard, it should be appreciated that the feedback mechanisms $610_0\text{-}610_{N-1}$ are provided so that the solutions for each polynomial equation $f_0(x(nT)), \ldots, f_{N-1}(x(nT))$ can be iteratively computed. Accordingly, the feedback mechanisms $610_0\text{-}610_{N-1}$ are comprised of hardware and/or software configured to selectively define a variable "x" of a polynomial equation as a solution computed in a previous iteration.

Referring again to FIG. 6, the computing processors $602_0\text{-}602_{N-1}$ are further comprised of hardware and/or software configured to express each of the RNS residue values in a binary number system representation. In this regard, the computing processors $602_0\text{-}602_{N-1}$ can employ an RNS-to-binary conversion method. Such methods are generally known to one of ordinary skill in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $602_0$-$602_{N-1}$ are further comprised of memory based tables (not shown) containing pre-computed residue values in a binary number system representation. The address space of each memory table is at least from zero (0) to $m_m$ for all m, $m_0$ through $m_{N-1}$. On each iteration, the table address is used to initiate the sequence. Still, the invention is not limited in this regard.

Referring again to FIG. 6, the mapping processor 604 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 604 can be comprised of hardware and/or software configured to determine the series of digits in the weighted number system based on the RNS residue values using a Chinese Remainder Theorem process. In this regard, it will be appreciated by one of ordinary skill in the art that the mapping processor 604 is comprised of hardware and/or software configured to identify a number in the weighted number system that is defined by the moduli solutions Nos. 1 through N.

In the various embodiments of the invention, the mapping processor 604 can be comprised of hardware and/or software configured to identify a truncated portion of a number in the weighted number system that is defined by the moduli solutions Nos. 1 through N. For example, the mapping processor 604 can also be comprised of hardware and/or software configured to select the truncated portion to include any serially arranged set of digits of the number in the weighted number system. Further, the mapping processor 604 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 6, the mapping processor 604 is comprised of hardware and/or software configured to express a chaotic sequence in a binary number system representation. In this regard, it should be appreciated that the mapping processor 604 can employ a weighted-to-binary conversion method. Such methods are generally known to one of ordinary skill in the art and therefore will not be described in great detail herein. However, it should be appreciated that any such method can be used without limitation.

One of ordinary skill in the art will appreciate that the chaotic generator 600 shown in FIG. 6 is an exemplary architecture for a chaotic generator. However, the invention is not limited in this regard and any other chaotic generator architecture can be used without limitation.

For example, in one embodiment, a chaotic generator architecture for generating a constant amplitude, zero auto-correlation (CAZAC) chaotic output signal is provided. In general, spread spectrum signals generated using Gaussian distributed chaotic sequences have a peak to average power ratio (PAPR) of about 13 dB. This difference between peak and average power typically requires a high power amplifier (HPA) gain to be reduced in order to avoid signal distortion. The reduction in gain is commonly referred to as HPA back-off because the gain of the amplifier must be reduced or "backed-off" from a compression point in order to ensure that the amplifier output is not distorted during times of peak signal amplitude. Notwithstanding the necessity of HPA back-off to prevent signal distortion, such techniques do have disadvantages. When HPA gain is reduced, the resulting average signal power output from the amplifier is reduced, thereby limiting its ability to overcome interference associated with natural and man-made interference. Further, when the signal must go through a multiple function repeater like a "bent pipe" satellite, the HPA gain may not be controllable. Therefore, in some embodiments of the invention, a CAZAC chaotic output signal is provided to overcome such problems. Such a signal is inherently useful when operating in a high power amplifier with a requirement for minimum back off from its saturation point because the chaotic CAZAC signal can be transmitted at a relatively higher operating point as compared to a signal which does not have a constant power envelope. To produce a chaotic CAZAC signal, the chaotic sequence generator is configured to select each sample of the spreading sequence to define a quadrature complex value with constant magnitude and a variable arbitrary phase angle having phase values which are uniformly distributed over a predetermined range of angles.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims. All of the apparatus, methods and algorithms disclosed and claimed herein can be made and executed without undue experimentation in light of the present disclosure. While the invention has been described in terms of a few exemplary embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method of recovering information encoded in a carrier modulated using a sequence of discrete-time chaotic samples and transmitted in a communications medium, the method comprising the steps of:

receiving a composite signal comprising a plurality of multi-path components, each of said plurality of multi-path components associated with a plurality of multi-path images of a transmitted signal;

combining said sequence of discrete-time chaotic samples and a first dominate component of said plurality of multi-path components to obtain a first reference input signal;

analyzing samples of said first reference input signal which are contained in a first correlation window to determine a first time-offset value;

time synchronizing said sequence of discrete-time chaotic samples with said first dominant component using said first time-offset value;

combining said sequence of discrete-time chaotic samples, which was time synchronized, with each of a plurality of second dominant components of said plurality of multi-path components to obtain a plurality of second reference input signals;

analyzing samples of each said second reference input signal which are contained in a second correlation window to determine one of a plurality of different second time-offset values, said second correlation window smaller than said first correlation window;

correlating the received composite signal with a spreading sequence using said plurality of different second time-offset values to generate a plurality of time-offset de-spread signals associated with said plurality of second dominate components, said spreading sequence based on said sequence of discrete-time chaotic samples;

modifying at least a portion of said plurality of time-offset de-spread signals based at least on said second time-offset values to synchronize said plurality of time-offset de-spread signals; and combining said plurality of de-spread signals into a combined coherent de-spread signal after said modifying.

2. The method of claim 1, wherein the step of modifying further comprises:
adjusting said portion of said plurality of time-offset de-spread signals to synchronize said plurality of time-offset de-spread signals in time, in phase, and in frequency.

3. A method of recovering information encoded in a carrier modulated using a sequence of discrete-time chaotic samples and transmitted in a communications medium, the method comprising the steps of:
receiving a composite signal comprising a plurality of multi-path components, each of said plurality of multi-path components associated with a plurality of multi-path images of a transmitted signal;

correlating the received composite signal with a spreading sequence using different time-offset values to generate a plurality of time-offset de-spread signals associated with at least a portion of said plurality of multi-path components, said spreading sequence based on said sequence of discrete-time chaotic samples;

modifying at least a portion of said plurality of time-offset de-spread signals based at least on said time-offset values to synchronize said plurality of time-offset de-spread signals; and combining said plurality of de-spread signals into a combined coherent de-spread signal after said modifying;

wherein the step of correlating further comprises:
selecting a first dominant component of the plurality of multipath components in said composite signal;

determining an initial time offset value for synchronizing said sequence of discrete-time chaotic samples and the dominant component based on a first correlation window;

selecting at least a second dominant component of the plurality of multipath components in said composite signal;

determining said different time offset values for synchronizing said sequence of discrete-time chaotic samples using the first and the second dominant components based on said initial time offset value and second correlation windows smaller than said first correlation window.

4. The method of claim 3, wherein the step of selecting said first dominant component comprises:
determining a signal-to-noise ratio (SNR) for the plurality of multipath components;
choosing a one of said plurality of multipath components having a highest (SNR) as said first dominant component.

5. The method of claim 4, wherein the step of selecting said at least second dominant component comprises:
choosing at least one other of said plurality of multipath components having a next highest SNR.

6. The method of claim 3, where said correlating further comprises:
adjusting said sequence of discrete time chaotic samples and at least one operating parameter for modifying said portion of said plurality of time-offset de-spread signals based at least on a mean location of the first and the second dominant components as a function of time.

7. The method of claim 1, wherein said sequence of discrete time chaotic samples is generated by:
selecting a plurality of polynomial equations;
using residue number system (RNS) arithmetic operations to respectively determine a plurality of solutions for said plurality of polynomial equations, said plurality of solutions iteratively computed and expressed as RNS residue values; and
determining a series of digits in a weighted number system based on said plurality of RNS residue values.

8. The method according to claim 7, further comprising using a Chinese Remainder Theorem or mixed-radix conversion process to determine a series of digits in said weighted number system based on said plurality of RNS residue values.

9. The method of claim 1, wherein said sequence of discrete-time chaotic samples are generated using a chaotic constant amplitude zero autocorrelation (CAZAC) waveform.

10. A receiver in a communications system, comprising:
an antenna system configured to receive a composite signal comprising a plurality of multi-path components, each of said plurality of multi-path components associated with a plurality of multi-path images of a transmitted signal;

a correlation system configured to
combine a de-spreading sequence and a first dominate component of said plurality of multi-path components to obtain a first reference input signal, analyze samples of said de-spreading sequence which are contained in a first correlation window to determine a first time-offset value, time synchronizing said de-spreading sequence with said first dominant component using said first time-offset value, combining said de-spreading sequence, which was time synchronized with said first dominant component, with each of a plurality of second dominant components of said plurality of multi-path components to obtain a plurality of second reference input signals, and correlate the received composite signal with said de-spreading sequence using said plurality of different second time-offset values to generate a plurality of time-offset de-spread signals associated with said plurality of second dominant components, said de-spreading sequence based on a sequence of discrete-time chaotic samples;

a plurality of receiver fingers configured to generate a plurality of synchronized de-spread signals from said plurality of time-offset de-spread signals based at least on said time-offset values; and a combiner configured to combine said plurality of de-spread signals into a combined coherent de-spread signal after said plurality of synchronized de-spread signal generated.

11. The receiver of claim 10, wherein said plurality of receiver fingers are further configured during said generating to modify at least a portion of said plurality of time-offset de-spread signals to synchronize said plurality of time-offset de-spread signals in time, in phase, and in frequency.

12. A receiver in communications system comprising:
an antenna system configured to receive a composite signal comprising a plurality of multi-path components, each of said plurality of multi-path components associated with a plurality of multi-path images of a transmitted signal;

a correlation system configured to correlate the received composite signal with a spreading sequence using different time-offset values to generate a plurality of time-offset de-spread signals associated with at least a portion of said plurality of multi-path images, said spreading sequence based on a sequence of discrete-time chaotic samples;

a plurality of receiver fingers configured to generate a plurality of synchronized de-spread signals from said plurality of time-offset de-spread signals based at least on said time-offset values; and a combiner configured to combine said plurality of de-spread signals into a combined coherent de-spread signal after said modifying;

wherein said correlator system is further configured during said correlating to:
select a first dominant component of the plurality of multipath components in said composite signal;
determine an initial time offset value for synchronizing said sequence of discrete-time chaotic samples and the dominant component based on a first correlation window;
select at least a second dominant component of the plurality of multipath components in said composite signal; and
determine said different time offset values for synchronizing said sequence of discrete-time chaotic samples using the first and the second dominant components based on said initial time offset value and second correlation windows smaller than said first correlation window.

13. The system of claim 12, wherein said correlator system is further configured during said selecting of said first dominant component to determine a signal-to-noise ratio (SNR) for the plurality of multipath components, and choose a one of said plurality of multipath components having a highest SNR as said first dominant component.

14. The system of claim 13, wherein said correlator system is further configured during said selecting of said at least second dominant component to choose at least one other of said plurality of multipath components having a next highest SNR.

15. The system of claim 12, where said correlator system is further configured during said correlating to adjust said sequence of discrete time chaotic samples and at least one operating parameter for modifying said portion of said plurality of time-offset de-spread signals based at least on a mean location of the first and the second dominant components as a function of time.

16. The system of claim 10, further comprising a chaos generator to generate said sequence of discrete time chaotic samples.

17. The system of claim 16, wherein said chaos generator comprises a chaotic constant amplitude zero autocorrelation (CAZAC) waveform generator.

18. The system of claim 10, further comprising a controller configured to generate operating parameters for each of said plurality of receiver fingers and to associate each of said plurality of time-offset de-spread signals with a different one of said plurality of receiver fingers.

19. The system of claim 10, wherein said correlation system is configured to perform an adaptive correlation to generate said plurality of time-offset de-spread signals.

20. A RAKE receiver, comprising:
an antenna system configured to receive a composite signal comprising a plurality of multi-path components, each of said plurality of multi-path components associated with a plurality of multi-path images of a transmitted signal;

a correlation system configured to
combine a de-spreading sequence and a first dominate component of said plurality of multi-path components to obtain a first reference input signal,
analyze samples of said de-spreading sequence which are contained in a first correlation window to determine a first time-offset value,
time synchronizing said de-spreading sequence with said first dominant component using said first time-offset value,
combining said de-spreading sequence, which was time synchronized with said first dominant component, with each of a plurality of second dominant components of said plurality of multi-path components to obtain a plurality of second reference input signals, and
correlate the received composite signal with said de-spreading sequence using said plurality of different second time-offset values to generate a plurality of time-offset de-spread signals associated with said plurality of second dominant components, said de-spreading sequence based on a sequence of discrete-time chaotic samples;

a plurality of RAKE receiver fingers configured to modify at least a portion of said plurality of time-offset de-spread signals based at least on said second time-offset values to synchronize said plurality of time-offset de-spread signals;

a controller configured to generate operating parameters for each of said plurality of RAKE receiver fingers and to associate each of said plurality of time-offset de-spread signals with a different one of said plurality of RAKE receiver fingers; and a combiner configured to combine said plurality of de-spread signals from said plurality of RAKE fingers into a combined phase coherent de-spread signal.

* * * * *